US010739645B2

(12) United States Patent
Sasaki et al.

(10) Patent No.: US 10,739,645 B2
(45) Date of Patent: Aug. 11, 2020

(54) LIQUID CRYSTAL DISPLAY APPARATUS AND MANUFACTURING METHOD OF LIQUID CRYSTAL DISPLAY APPARATUS

(71) Applicant: SHARP KABUSHIKI KAISHA, Sakai, Osaka (JP)

(72) Inventors: Takahiro Sasaki, Sakai (JP); Iori Aoyama, Sakai (JP); Yuichi Kita, Sakai (JP); Kazutaka Hanaoka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 27 days.

(21) Appl. No.: 16/090,241

(22) PCT Filed: Mar. 28, 2017

(86) PCT No.: PCT/JP2017/012626
§ 371 (c)(1),
(2) Date: Sep. 29, 2018

(87) PCT Pub. No.: WO2017/170542
PCT Pub. Date: Oct. 5, 2017

(65) Prior Publication Data
US 2019/0113810 A1 Apr. 18, 2019

(30) Foreign Application Priority Data
Mar. 29, 2016 (JP) ................................ 2016-065423

(51) Int. Cl.
*G02F 1/1337* (2006.01)
*G02F 1/1343* (2006.01)
(Continued)

(52) U.S. Cl.
CPC ...... *G02F 1/133753* (2013.01); *G02F 1/1393* (2013.01); *G02F 1/133707* (2013.01);
(Continued)

(58) Field of Classification Search
CPC ..... G02F 2001/13775; G02F 1/133707; G02F 2001/134381
See application file for complete search history.

(56) References Cited

U.S. PATENT DOCUMENTS

2003/0086044 A1 5/2003 Inoue et al.
2006/0114378 A1* 6/2006 Choi ..................... G02F 1/1395 349/110
(Continued)

FOREIGN PATENT DOCUMENTS

JP 2008-102545 A 5/2008
JP 2011-053721 A 3/2011
(Continued)

*Primary Examiner* — Alexander P Gross
(74) *Attorney, Agent, or Firm* — ScienBiziP, P.C.

(57) ABSTRACT

A liquid crystal display apparatus includes a liquid crystal display panel including a first substrate, a second substrate, and a liquid crystal layer and a plurality of pixels. The first substrate includes a first electrode provided in each of the pixels and a first horizontal alignment film that determines a pretilt orientation of a liquid crystal molecule. The second substrate includes a second electrode provided to face the first electrode and a second horizontal alignment film that determines the pretilt orientation of the liquid crystal molecule. Each of the first and second horizontal alignment films is a photoalignment film. At least one of the first substrate and the second substrate includes an anchoring structure in each of the pixels. The liquid crystal display panel further includes an alignment sustaining layer which is formed on the surface of each of the first and second horizontal alignment films on the liquid crystal layer side, is configured with a photopolymer, and imparts a pretilt angle greater than 0° to the liquid crystal molecules.

9 Claims, 18 Drawing Sheets

(51) Int. Cl.

| | |
|---|---|
| ***G02F 1/139*** | (2006.01) |
| ***G02F 1/137*** | (2006.01) |
| ***G02F 1/1335*** | (2006.01) |

(52) U.S. Cl.

CPC .. *G02F 1/133788* (2013.01); *G02F 1/134309* (2013.01); *G02F 1/133512* (2013.01); *G02F 2001/13775* (2013.01); *G02F 2001/133738* (2013.01); *G02F 2001/134381* (2013.01)

(56) References Cited

U.S. PATENT DOCUMENTS

| | | | | |
|---|---|---|---|---|
| 2006/0114396 | A1* | 6/2006 | Choi | G02F 1/1395 349/139 |
| 2006/0202162 | A1* | 9/2006 | Lin | C09K 19/56 252/299.4 |
| 2009/0284703 | A1 | 11/2009 | Shoraku et al. | |
| 2010/0014012 | A1 | 1/2010 | Irie et al. | |
| 2012/0033167 | A1 | 2/2012 | Mizusaki et al. | |
| 2014/0368481 | A1* | 12/2014 | Tomikawa | G09G 3/3614 345/205 |
| 2016/0178979 | A1* | 6/2016 | Kita | G02F 1/134309 349/33 |

FOREIGN PATENT DOCUMENTS

| | | | | |
|---|---|---|---|---|
| JP | 2012-078875 | A | 4/2012 | |
| WO | 2008/078438 | A1 | 7/2008 | |
| WO | 2010/116564 | A1 | 10/2010 | |
| WO | 2014/136586 | A1 | 9/2014 | |
| WO | WO-2014136586 | A1 * | 9/2014 | G02F 1/1396 |

* cited by examiner

LIQUID CRYSTAL DISPLAY APPARATUS AND MANUFACTURING METHOD OF LIQUID CRYSTAL DISPLAY APPARATUS

TECHNICAL FIELD

The present invention relates to a liquid crystal display apparatus, particularly, to the liquid crystal display apparatus including a photoalignment film as a horizontal alignment film. In addition, the present invention also relates to a manufacturing method of such a liquid crystal display apparatus.

BACKGROUND ART

In the related art, as alignment processing on an alignment film provided in a liquid crystal display apparatus, rubbing processing has been the mainstream. However, in recent years, photoalignment processing is put to practical use. The photoalignment processing is more excellent than rubbing processing in that dust or static electricity is not generated in the photoalignment processing.

PTL 1 discloses a liquid crystal display apparatus including an alignment film subjected to the photoalignment processing (referred to as “a photoalignment film”). The liquid crystal display apparatus disclosed in PTL 1 is a vertical alignment (VA) mode liquid crystal display apparatus. A photoalignment film of this liquid crystal display apparatus is a vertical alignment film that causes liquid crystal molecules to be vertically aligned in a state where a voltage is not applied.

The photoalignment processing can also be used for a horizontal alignment film in addition to a vertical alignment film disclosed in PTL 1.

CITATION LIST

Patent Literature

PTL 1: Japanese Unexamined Patent Application Publication No. 2011-053721

SUMMARY OF INVENTION

Technical Problem

However, according to the examination of the inventor, in a case where photoalignment processing is used for a horizontal alignment film, it is understood that there are problems as follows.

The alignment direction (pretilt direction) of a liquid crystal molecule in a state where a voltage is not applied to a liquid crystal layer is represented by “a pretilt orientation” and “a pretilt angle”. The pretilt orientation means a component of a vector in the plane of the liquid crystal layer (in the substrate surface). The vector indicates the alignment direction of a liquid crystal molecule in the liquid crystal layer to which a voltage is not applied. The pretilt angle means an angle of a major axis of the liquid crystal molecule to the substrate surface.

Currently, in a case where photoalignment processing is performed on the horizontal alignment film, the pretilt orientation can be freely controlled, but controlling the pretilt angle is not possible. That is, the pretilt angle defined by the horizontal alignment film subjected to the photoalignment processing is 0°, and a material of an alignment film or a manufacturing process which enables the pretilt angle to be greater than 0° has not been found.

In an in-plane switching (IPS) mode or a fringe field switching (FFS) mode (also collectively referred to as “a transverse electric field mode”), the pretilt angle is preferably 0°. However, in a twisted nematic (TN) mode or an electrically-controlled birefringence (ECB) mode, the pretilt angle which is greater than 0° is required for clearly determining a direction in which liquid crystal molecules rise when a voltage is applied.

As described above, in the current photoalignment technology, it is not possible to realize a horizontal alignment state in which the pretilt angle is greater than 0°. Thus, there is a problem in that it is not possible to apply the current photoalignment technology to liquid crystal display apparatuses of some display modes (for example, TN mode or ECB mode described above).

Considering the above-described problems, an object of the present invention is to provide a liquid crystal display apparatus that can realize a horizontal alignment state in which the pretilt angle is greater than 0° even though the photoalignment film is provided as the horizontal alignment film.

Solution to Problem

According to an embodiment of the present invention, a liquid crystal display apparatus includes a liquid crystal display panel which includes a first substrate and a second substrate facing each other and a liquid crystal layer provided between the first substrate and the second substrate and a plurality of pixels arranged in a matrix. The first substrate includes a first electrode which is provided in each of the plurality of pixels, and a first horizontal alignment film which is provided between the first electrode and the liquid crystal layer and determines a pretilt orientation of a liquid crystal molecule in the liquid crystal layer. The second substrate includes a second electrode provided to face the first electrode, and a second horizontal alignment film that is provided between the second electrode and the liquid crystal layer and determines the pretilt orientation of the liquid crystal molecule. Each of the first horizontal alignment film and the second horizontal alignment film is a photoalignment film. At least one of the first substrate and the second substrate includes an anchoring structure of applying an anchoring force to the liquid crystal molecule at least when a voltage is applied to the liquid crystal layer, in each of the plurality of pixels. The liquid crystal display panel further includes an alignment sustaining layer which is formed on a surface of each of the first horizontal alignment film and the second horizontal alignment film on the liquid crystal layer side, is configured with a photopolymer, and imparts the pretilt angle greater than 0° to the liquid crystal molecule in the liquid crystal layer.

In the embodiment, the anchoring structure is a first rib provided on the first electrode, a second rib provided on the second electrode, a first slit formed in the first electrode, or a second slit formed in the second electrode.

In the embodiment, the liquid crystal display panel includes a light shielding layer overlapping the anchoring structure.

In the embodiment, the first substrate includes the anchoring structure, and the first substrate includes a light shielding layer overlapping the anchoring structure of the first substrate.

In the embodiment, the second substrate includes the anchoring structure, and the second substrate includes a light shielding layer overlapping the anchoring structure of the second substrate.

In the embodiment, each of the first substrate and the second substrate includes the anchoring structure. The first substrate includes a first light shielding layer overlapping the anchoring structure of the first substrate. The second substrate includes a second light shielding layer overlapping the anchoring structure of the second substrate.

In the embodiment, the first rib and the second rib have a light shielding property.

In the embodiment, the anchoring structure extends in a first direction. The first electrode and/or the second electrode includes a plurality of third slits which extend in a second direction which is substantially orthogonal to the first direction and has a width smaller than a width of the anchoring structure.

In the embodiment, the anchoring structure extends in a first direction. The first electrode includes a plurality of fourth slits which extend in a third direction intersecting the first direction and has a width smaller than a width of the anchoring structure. The second electrode includes a plurality of fifth slits which extend in a fourth direction intersecting the first direction and has a width smaller than a width of the anchoring structure. The third direction is substantially parallel to the pretilt orientation determined by the first horizontal alignment film. The fourth direction is substantially parallel to the pretilt orientation determined by the second horizontal alignment film.

In the embodiment, the pretilt orientation determined by the first horizontal alignment film and the pretilt orientation determined by the second horizontal alignment film form an angle of about 90°.

In the embodiment, the pretilt orientation determined by the first horizontal alignment film is substantially parallel to the pretilt orientation determined by the second horizontal alignment film.

In the embodiment, the anchoring structure extends in a first direction. In each of the plurality of pixels, the liquid crystal layer includes two regions which are positioned on both sides of the anchoring structure and have pretilt directions different from each other. The pretilt direction is represented by the pretilt orientation determined by the first horizontal alignment film and the pretilt angle determined by the alignment sustaining layer formed on the surface of the first horizontal alignment film on the liquid crystal layer side. Lengths of the two regions in a direction orthogonal to the first direction are different from each other.

In the embodiment, the first substrate includes a third electrode that generates a transverse electric field along with the first electrode in the liquid crystal layer.

In the embodiment, the first electrode is provided to be positioned on the third electrode with an insulating layer interposed between the first electrode and the third electrode.

In the embodiment, each of the plurality of pixels is capable of being switched between a black display state, a white display state, and a transparent display state. In the black display state, black display is performed in a state where a vertical electric field is generated in the liquid crystal layer. In the white display state, white display is performed in a state where a transverse electric field is generated in the liquid crystal layer. In the transparent display state, a back surface side of the liquid crystal display panel is seen through in a state where a voltage is not applied to the liquid crystal layer.

In the embodiment, the liquid crystal display apparatus further includes a lighting element capable of performing switching between plural kinds of color light including red light, green light, and blue light and irradiating the liquid crystal display panel with the switched light.

In the embodiment, the liquid crystal display apparatus performs color display by a color-field sequential method.

In the embodiment, the liquid crystal display panel does not include a color filter.

According to another embodiment of the present invention, a manufacturing method of a liquid crystal display apparatus includes a step of preparing a first substrate including a first electrode and a first horizontal alignment film provided on the first electrode, a step of preparing a second substrate including a second electrode and a second horizontal alignment film provided on the second electrode, a step of producing a liquid crystal display panel in which a liquid crystal layer including a photopolymerizable compound is provided between the first substrate and the second substrate, and a step of forming an alignment sustaining layer on each of the first horizontal alignment film and the second horizontal alignment film in a manner that the photopolymerizable compound is polymerized by irradiating the liquid crystal display panel with light. The step of preparing the first substrate includes a step of performing photoalignment processing on the first horizontal alignment film. The step of preparing the second substrate includes a step of performing the photoalignment processing on the second horizontal alignment film. At least one of the first substrate and the second substrate includes an anchoring structure that applies an anchoring force to a liquid crystal molecule in the liquid crystal layer at least when a voltage is applied to the liquid crystal layer. The step of forming the alignment sustaining layer is performed in a state where a voltage is applied between the first electrode and the second electrode, and a tilt angle of the liquid crystal molecule is greater than 0°.

Advantageous Effects of Invention

According to the embodiment of the present invention, there is provided a liquid crystal display apparatus in which it is possible to realize a horizontal alignment state in which a pretilt angle is greater than 0° even though a photoalignment film is not provided as a horizontal alignment film.

BRIEF DESCRIPTION OF DRAWINGS

FIG. 28(*a*) illustrates a state where black display is performed, and FIG. 28(*b*) illustrates a state where white display is performed.

DESCRIPTION OF EMBODIMENTS

Hereinafter, embodiments of the present invention will be described with reference to the drawings. The present invention is not limited to the following embodiments.

Embodiment 1

Figure 1:
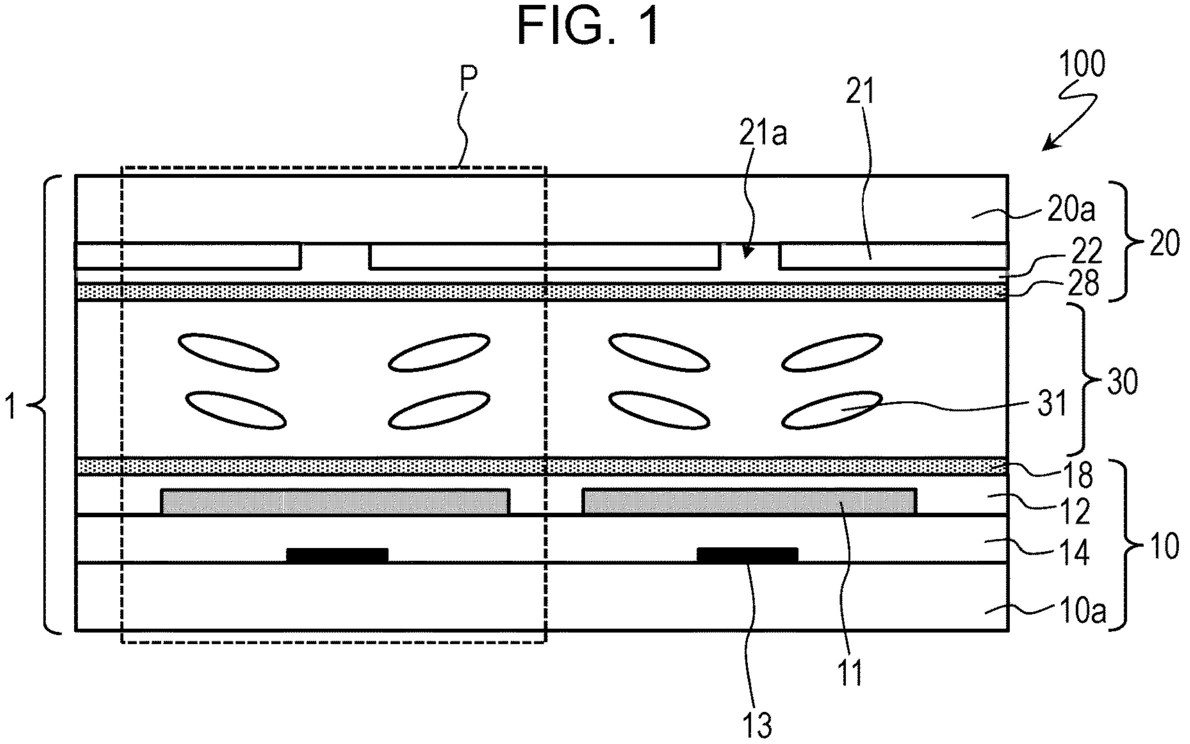
FIG. 1 is a sectional view schematically illustrating a liquid crystal display apparatus 100 according to an embodiment of the present invention, and illustrates regions corresponding to two pixels P.
Figure 2:
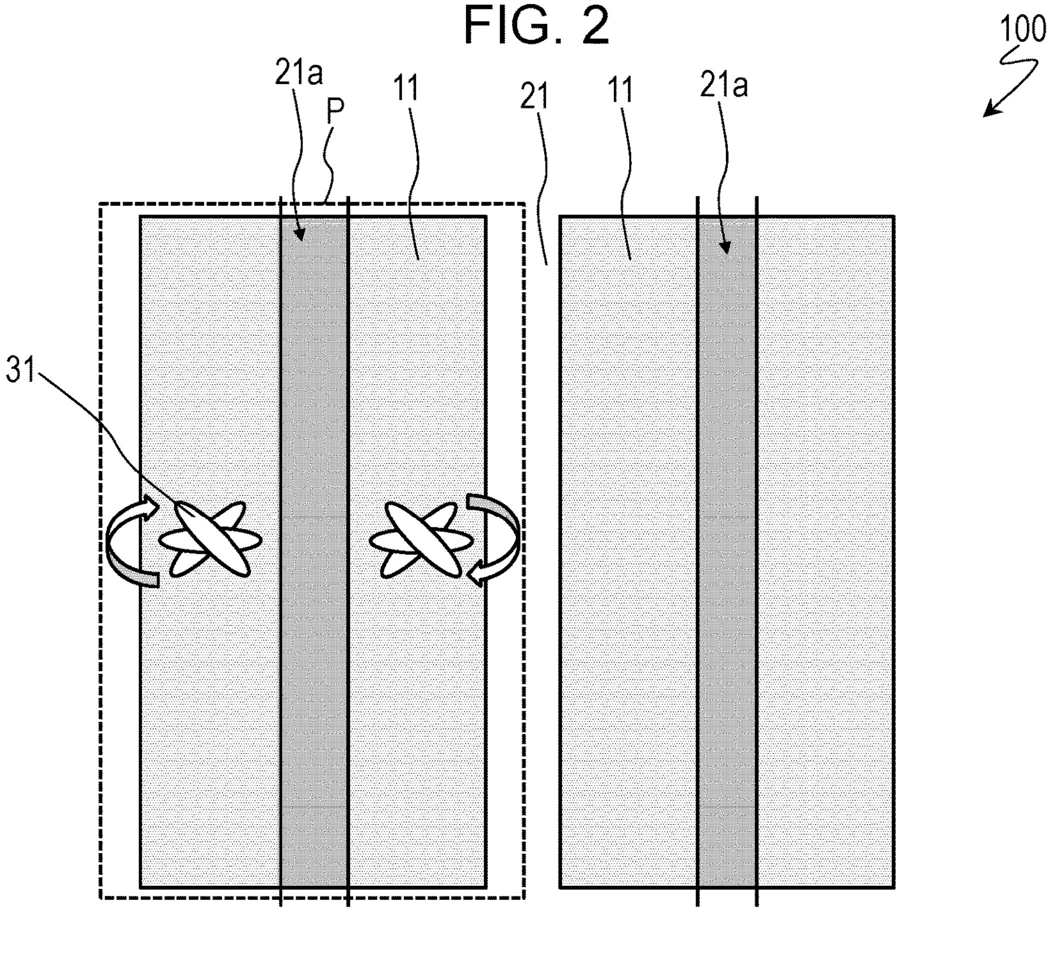
FIG. 2 is a plan view schematically illustrating the liquid crystal display apparatus 100 and illustrates the regions corresponding to the two pixels P.

FIGS. 1 and 2 illustrate a liquid crystal display apparatus 100 according to an embodiment. FIGS. 1 and 2 are a sectional view and a plan view schematically illustrating the liquid crystal display apparatus 100, respectively.

As illustrated in FIGS. 1 and 2, the liquid crystal display apparatus 100 includes a liquid crystal display panel 1 and has a plurality of pixels P. The plurality of pixels P is arranged in a matrix. FIGS. 1 and 2 illustrate regions corresponding to two pixels P which are adjacent to each other in a row direction.

The liquid crystal display panel 1 includes a first substrate 10 and a second substrate 20 facing each other, and a liquid crystal layer 30 provided between the first substrate 10 and the second substrate 20. The first substrate 10 is disposed on the back surface side (opposite side of an observer) of the liquid crystal layer 30. The second substrate 20 is disposed on the front surface side (observer side) of the liquid crystal layer 30. In the following descriptions, the first substrate 10 is referred to as "a back substrate", and the second substrate 20 is referred to as "a front substrate". Here, the back substrate 10 is an active matrix substrate. The front substrate 20 is a color filter substrate.

The back substrate 10 includes a first electrode 11 and a first horizontal alignment film 12. The first electrode is provided in each of the plurality of pixels P. The first horizontal alignment film is provided on the first electrode 11 (that is, between the first electrode 11 and the liquid crystal layer 30).

The first electrode 11 is formed of a transparent conductive material (for example, ITO). The first electrode 11 is electrically connected to a drain electrode of a thin film transistor (TFT: not illustrated) provided in each of the pixels P. That is, the first electrode 11 is a pixel electrode.

The first horizontal alignment film 12 determines the pretilt orientation of liquid crystal molecules 31 in the liquid crystal layer 30 (more specifically, liquid crystal molecules 31 in the vicinity of the first horizontal alignment film 12). The first horizontal alignment film 12 is subjected to photoalignment processing. That is, the first horizontal alignment film 12 is a photoalignment film.

The back substrate 10 further includes a light shielding layer 13 disposed at a predetermined position and an insulating layer 14 covering the light shielding layer 13. The specific position of the light shielding layer 13 will be described later.

The components (first electrode 11 and the like) of the back substrate 10 are supported by a transparent substrate 10*a* (for example, glass substrate or a plastic substrate) having an insulating property. Here, the light shielding layer 13, the insulating layer 14, the first electrode 11, and the first horizontal alignment film 12 are formed on the surface of the transparent substrate 10*a* on the liquid crystal layer 30 side in this order.

The front substrate 20 includes a second electrode (counter electrode) 21 and a second horizontal alignment film 22. The second electrode is provided to face the first electrode 11. The second horizontal alignment film is provided on the second electrode 21 (that is, between the second electrode 21 and the liquid crystal layer 30).

The second electrode 21 is formed of a transparent conductive material (for example, ITO). The second electrode 21 is not required to be independently provided for each pixel P and may be provided as a common electrode for the plurality of pixels P.

The second horizontal alignment film 22 determines the pretilt orientation of liquid crystal molecules 31 (more specifically, liquid crystal molecules 31 in the vicinity of the second horizontal alignment film 22). The second horizontal alignment film 22 is subjected to photoalignment processing. That is, the second horizontal alignment film 22 is a photoalignment film.

The front substrate 20 further includes a color filter or a black matrix (not illustrated).

The components (second electrode 21 and the like) of the front substrate 20 are supported by a transparent substrate 20*a* (for example, glass substrate or a plastic substrate) having an insulating property. Here, the second electrode 21 and the second horizontal alignment film 22 are formed on the surface of the transparent substrate 20*a* on the liquid crystal layer 30 side in this order.

The liquid crystal layer 30 is configured with a positive type liquid crystal material. That is, liquid crystal molecules 31 in the liquid crystal layer 30 have positive dielectric anisotropy. FIGS. 1 and 2 illustrate an alignment direction of a liquid crystal molecule 31 in a state where a voltage is not applied to the liquid crystal layer 30.

As illustrated in FIG. 2, the pretilt orientation determined by the first horizontal alignment film 12 and the pretilt orientation determined by the second horizontal alignment film 22 form an angle of about 90°. Thus, in a state where a voltage is not applied, liquid crystal molecules 31 are twisted-aligned by about 90°.

The front substrate 20 includes an anchoring structure that applies an anchoring force to the liquid crystal molecule 31 when a voltage is applied to the liquid crystal layer 30, in each of the plurality of pixels P. In the embodiment, the anchoring structure is a slit 21*a* formed in the second electrode 21.

The slit 21*a* extends in a predetermined direction. Here, the slit 21*a* extends in a column direction (up-and-down direction in FIG. 2). The width of the slit 21*a* is, for example, 5 μm to 10 μm, and it is not limited thereto.

In the example illustrated in FIGS. 1 and 2, one slit 21*a* is formed for each pixel column. The slit 21*a* is positioned in the vicinity of the center of each pixel P in the row direction. Each of the pretilt orientation determined by the first horizontal alignment film 12 and the pretilt orientation determined by second horizontal alignment film 22 has an angle of about 45° to the direction in which the slit 21*a* extends.

The light shielding layer 13 of the back substrate 10 is disposed to overlap the slit 21*a* as the anchoring structure.

The liquid crystal display panel 1 further includes one pair of alignment sustaining layers (first alignment sustaining layer and second alignment sustaining layer) 18 and 28. The first alignment sustaining layer 18 is formed on the surface of the first horizontal alignment film 12 on the liquid crystal layer 30 side. The second alignment sustaining layer 28 is formed on the surface of the second horizontal alignment film 22 on the liquid crystal layer 30 side.

Each of the first alignment sustaining layer 18 and the second alignment sustaining layer 28 is configured with a photopolymer. The first alignment sustaining layer 18 and the second alignment sustaining layer 28 are respectively formed on the first horizontal alignment film 12 and the second horizontal alignment film 22 by polymerizing a photopolymerizable compound in a state of being mixed with a liquid crystal material constituting the liquid crystal layer 30 in advance. An alignment state of a liquid crystal molecules 31 of when the first alignment sustaining layer 18 and the second alignment sustaining layer 28 are formed is sustained (stored) even after a voltage off (state where a voltage is not applied). Therefore, if the photopolymerizable compound is polymerized in a state where a voltage is applied between the first electrode 11 and the second electrode 21 (that is, to the liquid crystal layer 30), the first alignment sustaining layer 18 and the second alignment sustaining layer 28 are formed in a state where a liquid crystal molecule 31 is tilted by a vertical electric field generated in the liquid crystal layer 30 and the anchoring force of the anchoring structure (slit 21*a*). Thus, each of the first alignment sustaining layer 18 and the second alignment sustaining layer 28 which have been formed can impart a pretilt angle greater than 0° to the liquid crystal molecule 31 in the liquid crystal layer 30.

It is not necessary that the first alignment sustaining layer 18 continues on the first horizontal alignment film 12. The first alignment sustaining layer 18 may include a plurality of discontinuous (discretely-formed) island-like portions. Similarly, it is not necessary that the second alignment sustaining layer 28 continues on the second horizontal alignment film 22, and the second alignment sustaining layer 28 may include a plurality of discontinuous (discretely-formed) island-like portions.

As a material and a method for forming the first alignment sustaining layer 18 and the second alignment sustaining layer 28, for example, a material and a method for forming a polymer layer (layer configured with a photopolymer) used in a so-called PSA technology (polymer sustained alignment technology) can be used. The PSA technology is a technology for improving alignment stability or a response speed in a VA mode, and is proposed in Japanese Unexamined Patent Application Publication No. 2002-357830 or Japanese Unexamined Patent Application Publication No. 2003-307720, for example. Specifically, as the photopolymerizable compound, a monomer or an oligomer having a functional group such as an acrylate group, a methacrylate group, or vinyl group, which is capable of radical polymerization is preferably used. From a viewpoint of reactivity, a compound having an acrylate group or a methacrylate group is more preferable, and a compound having a multifunctional group among acrylate groups or methacrylate groups is further preferable. It is possible to more stably sustain alignment of liquid crystal molecules 31 by using a compound having a liquid crystal skeleton as the photopolymerizable compound. In particular, a compound disclosed in Japanese Unexamined Patent Application Publication No. 2003-307720, in which an acrylate group or a methacrylate group is directly bonded to a ring structure or a condensed-ring structure is preferable.

The liquid crystal display panel 10 further includes a pair of polarizers (not illustrated) facing each other with at least the liquid crystal layer 30 interposed between the polarizers. A polarization axis (transmission axis) of the polarizer provided on the back surface side of the liquid crystal layer 30 (typically, the back surface side of the transparent substrate 10*a*) is substantially parallel to or substantially orthogonal to the pretilt orientation determined by the first horizontal alignment film 12. A polarization axis (transmission axis) of the polarizer provided on the front surface side of the liquid crystal layer 30 (typically, the front surface side of the transparent substrate 20*a*) is substantially parallel to or substantially orthogonal to the pretilt orientation determined by the second horizontal alignment film 22.

As described above, in the liquid crystal display apparatus 100 in the embodiment, the pretilt orientations of the liquid crystal molecules 31 are determined by the first horizontal alignment film 12 and the second horizontal alignment film 22 as the photoalignment films. In addition, the pretilt angles greater than 0° are imparted to the liquid crystal molecules 31 by the first alignment sustaining layer 18 and the second alignment sustaining layer 28 formed on the surfaces of the first horizontal alignment film 12 and the second horizontal alignment film 22 on the liquid crystal layer 30. Therefore, as illustrated in FIG. 1, it is possible to realize a horizontal alignment state in which the pretilt angle is greater than 0°. The reason that the pretilt angles greater than 0° can be determined by the first alignment sustaining layer 18 and the second alignment sustaining layer 28 is that the liquid crystal display panel 1 includes an electrode structure (first electrode 11 and second electrode 21 facing each other with the liquid crystal layer 30 interposed between the electrodes) capable of generating a vertical electric field in the liquid crystal layer 30, and the anchoring structure (here, slit 21*a* of the second electrode 21).

Specifically, the pretilt angle determined by each of the first alignment sustaining layer 18 and the second alignment sustaining layer 28 is preferably 1° to 10° and more preferably 2° to 5°.

Figure 3:
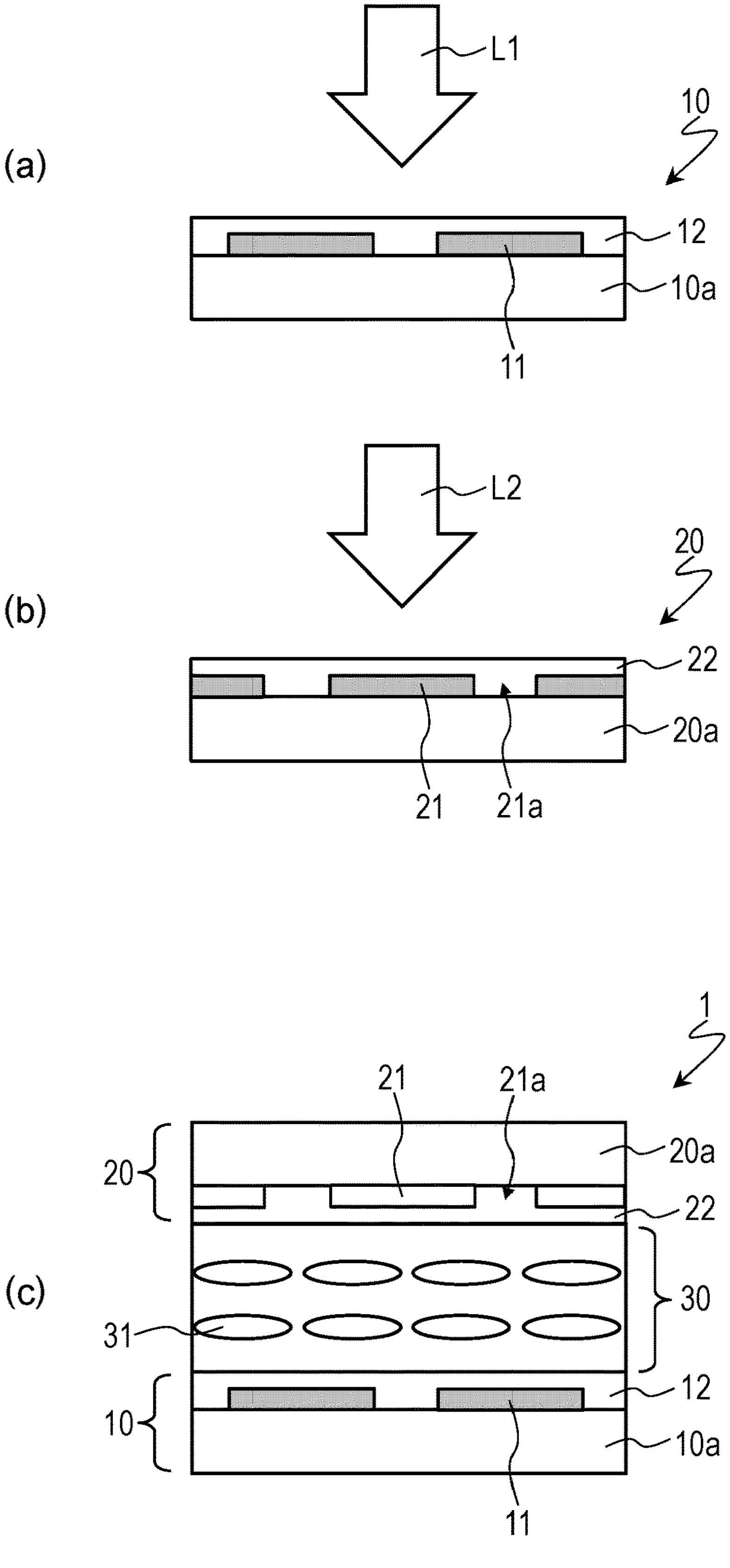
FIGS. 3(*a*) to 3(*c*) are step sectional views illustrating a manufacturing method of the liquid crystal display apparatus 100.

Here, a manufacturing method of the liquid crystal display apparatus 100 will be described with reference to FIGS. 3(*a*) to 4(*b*). FIGS. 3(*a*) to 4(*b*) are step sectional views illustrating a manufacturing method of the liquid crystal display apparatus 100.

Firstly, a back substrate 10 having a first electrode 11 and a first horizontal alignment film 12 provided on the first electrode 11 is prepared. As illustrated in FIG. 3(*a*), a step of preparing the back substrate 10 includes a step of performing photoalignment processing by irradiating the first horizontal alignment film 12 with light (for example, ultraviolet light) L1. As a material for forming the first horizontal alignment film 12, well-known materials of the horizontal alignment film can be used. Steps of forming components (for example, the first electrode 11, a TFT, and a bus line for supplying a signal to the TFT) other than the first horizontal alignment film 12 can also be performed by the well-known methods.

Separate to preparation of the back substrate 10, a front substrate 20 having a second electrode 21 and a second horizontal alignment film 22 provided on the second electrode 21 is prepared. As illustrated in FIG. 3(*b*), a step of preparing the front substrate 20 includes a step of performing photoalignment processing by irradiating the second horizontal alignment film 22 with light (for example, ultraviolet light) L2. As a material for forming the second horizontal alignment film 22, well-known materials of the horizontal alignment film can be used. Steps of forming components (for example, the second electrode 21) other than the second horizontal alignment film 22 can also be performed by the well-known methods. For example, the slit 21*a* of the second electrode 21 can be formed in a manner that a conductive film as the second electrode 21 is patterned by a photolithography process.

Then, as illustrated in FIG. 3(*c*), a liquid crystal display panel 1 in which a liquid crystal layer 30 including a photopolymerizable compound is provided between the back substrate 10 and the front substrate 20 is produced. Specifically, the liquid crystal display panel 1 can be produced in a manner that the back substrate 10 and the front substrate 20 are bonded to each other with a predetermined gap, and a liquid crystal material including the photopolymerizable compound is sealed between the back substrate 10 and the front substrate 20.

Figure 4:
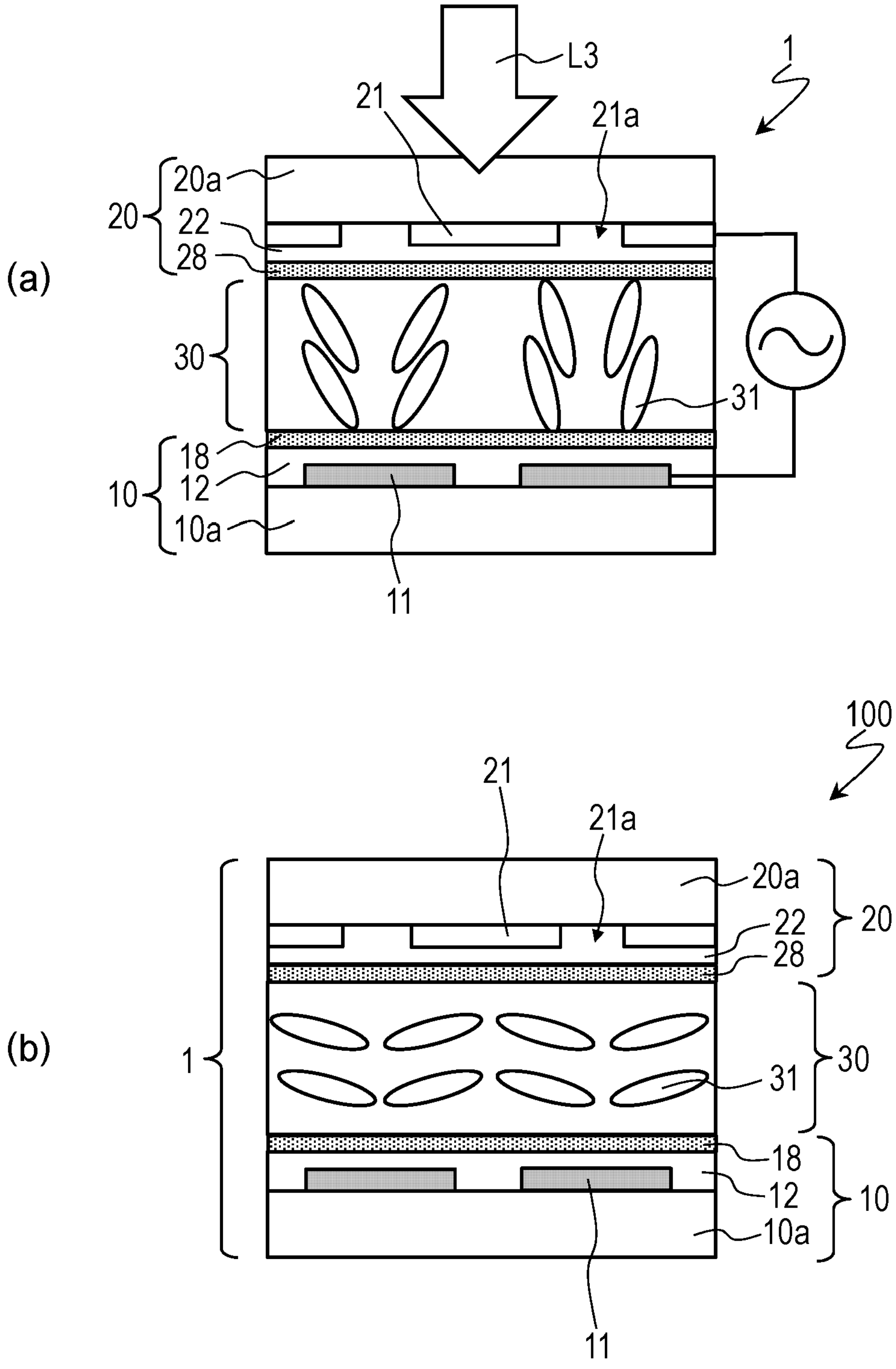
FIGS. 4(*a*) and 4(*b*) are step sectional views illustrating the manufacturing method of the liquid crystal display apparatus 100.

As illustrated in FIG. 4(*a*), if the liquid crystal display panel 1 is irradiated with light (for example, ultraviolet light) L3, the photopolymerizable compound is polymerized, and thereby the first alignment sustaining layer 18 and the second alignment sustaining layer 28 are respectively formed on the first horizontal alignment film 12 and the second horizontal alignment film 22. This step is performed in a state where a voltage is applied to the liquid crystal layer 30. If the voltage is applied to the liquid crystal layer 30, liquid crystal molecules 31 are tilted by a vertical electric field which is generated by the first electrode 11 and the second electrode 21 and an anchoring force of anchoring structure (slit 21*a*). Therefore, a step of forming the first alignment sustaining layer 18 and the second alignment sustaining layer 28 is performed in a state where a tilt angle of the liquid crystal molecule 31 is greater than 0°.

Then, a pair of polarizers (not illustrated) are respectively bonded to both sides of the liquid crystal display panel 1 (back surface side of the transparent substrate 10*a* and front surface side of the transparent substrate 20*a*), and thereby completing the liquid crystal display apparatus 100 as illustrated in FIG. 4(*b*).

A preferable configuration of the liquid crystal display apparatus 100 will be described.

Figure 5:
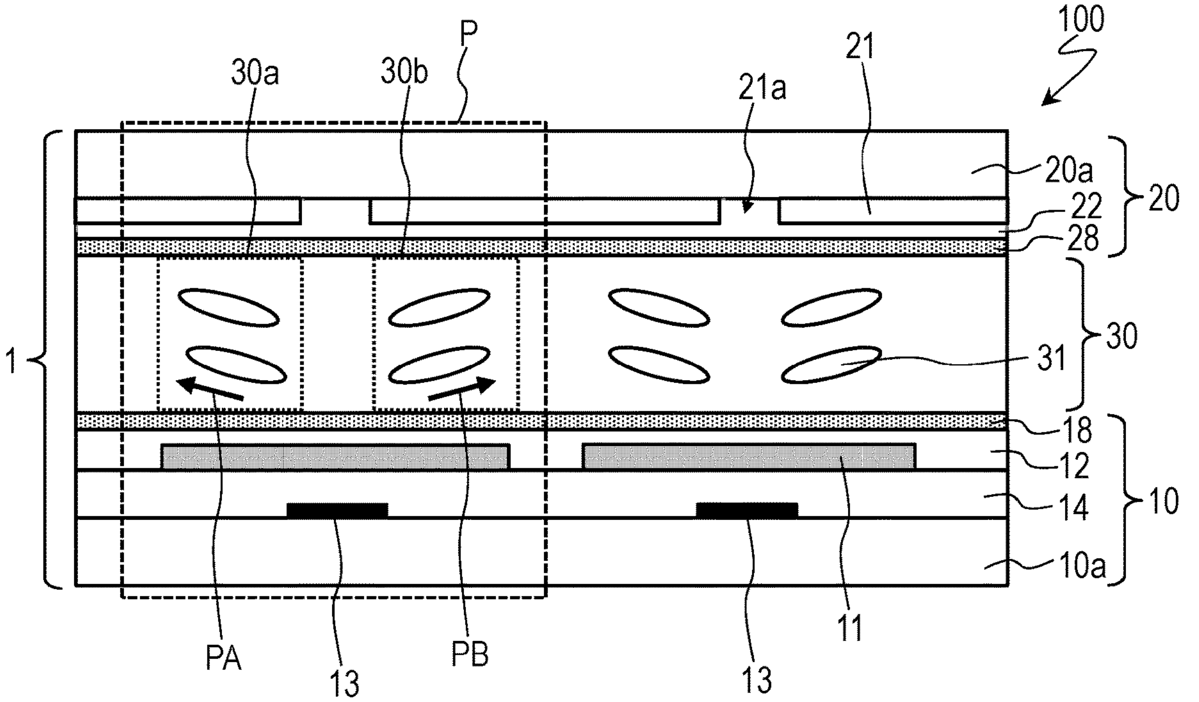
FIG. 5 is a sectional view schematically illustrating the liquid crystal display apparatus 100 and illustrates the regions corresponding to the two pixels P.

As illustrated in FIG. 5, in each pixel P, two regions 30*a* and 30*b* (for convenience, the regions are referred to as "a first domain" and "a second domain", respectively) in which pretilt directions PA and PB are different from each other are provided on both sides of the slit 21*a* as the anchoring structure. That is, in each pixel P, the liquid crystal layer 30 includes the first domain 30*a* and the second domain 30*b* in which the pretilt directions PA and PB are different from each other. A disclination line (white line) may occur at a boundary portion between the first domain 30*a* and the second domain 30*b* (that is, a region overlapping the anchoring structure). Therefore, as in the liquid crystal display apparatus 100 in the embodiment, it is preferable that the light shielding layer 13 is provided at a position overlapping the slit 21*a* as the anchoring structure. Since such a light shielding layer 13 is provided, it is possible to suppress degradation of display quality caused by an occurrence of the disclination line.

In the configuration illustrated in FIGS. 1 and 5, the light shielding layer 13 is provided in the back substrate 10. In this case, the light shielding layer 13 may be formed by a conductive film which is the same as that of the bust line, for example. The bus line may also function as the light shielding layer 13.

Figure 6:
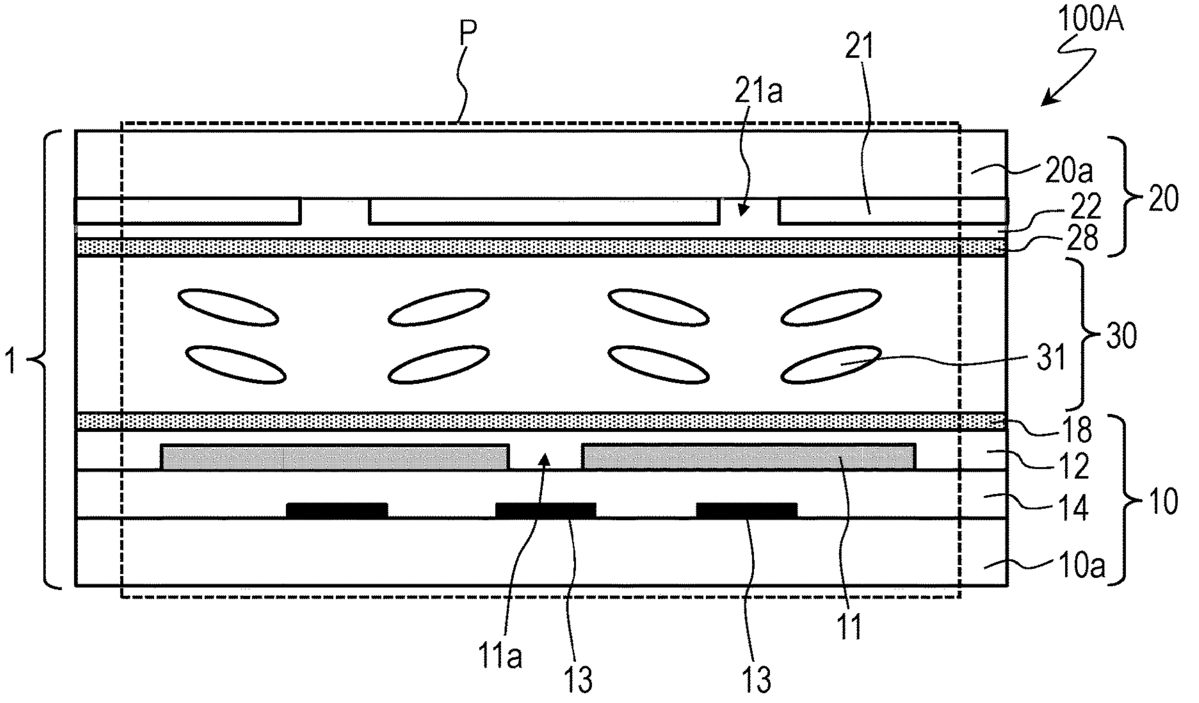
FIG. 6 is a sectional view schematically illustrating a liquid crystal display apparatus 100A according to the embodiment of the present invention and illustrates a region corresponding to one pixel P.

FIG. 6 illustrates another liquid crystal display apparatus 100A in the embodiment. FIG. 6 is a sectional view schematically illustrating the liquid crystal display apparatus 100A and illustrates a region corresponding to one pixel P.

In the liquid crystal display apparatus 100A illustrated in FIG. 6, not only the front substrate 20 has the anchoring structure (slit 21*a* in the second electrode 21) but also the back substrate 10 has an anchoring structure. Here, the anchoring structure of the back substrate 10 is a slit 11*a* formed in the first electrode 11. The slit 11*a* in the back substrate 10 extends in the same direction as the slit 21*a* in the front substrate 20. The width of the slit 11*a* is, for example, 5 μm to 10 μm, and it is not limited thereto.

The back substrate 10 includes a light shielding layer 13 overlapping the slit 11*a* in the back substrate 10 in addition to the light shielding layer 13 overlapping the slit 21*a* in the front substrate 20.

As described above, at least one of the back substrate 10 and the front substrate 20 may have an anchoring structure. Although not illustrated here, a configuration in which the back substrate 10 has an anchoring structure, and the front substrate 20 dose not have an anchoring structure may be made.

Embodiment 2

Figure 7:
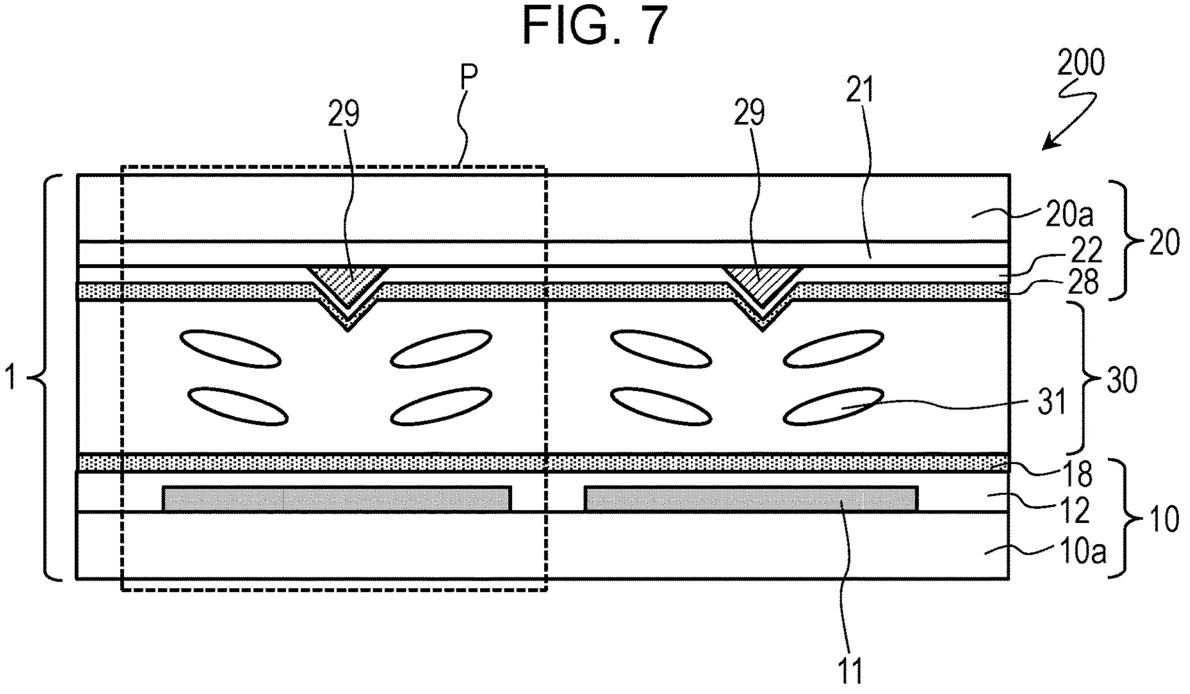
FIG. 7 is a sectional view schematically illustrating a liquid crystal display apparatus 200 according to another embodiment of the present invention and illustrates regions corresponding to two pixels P.
Figure 8:
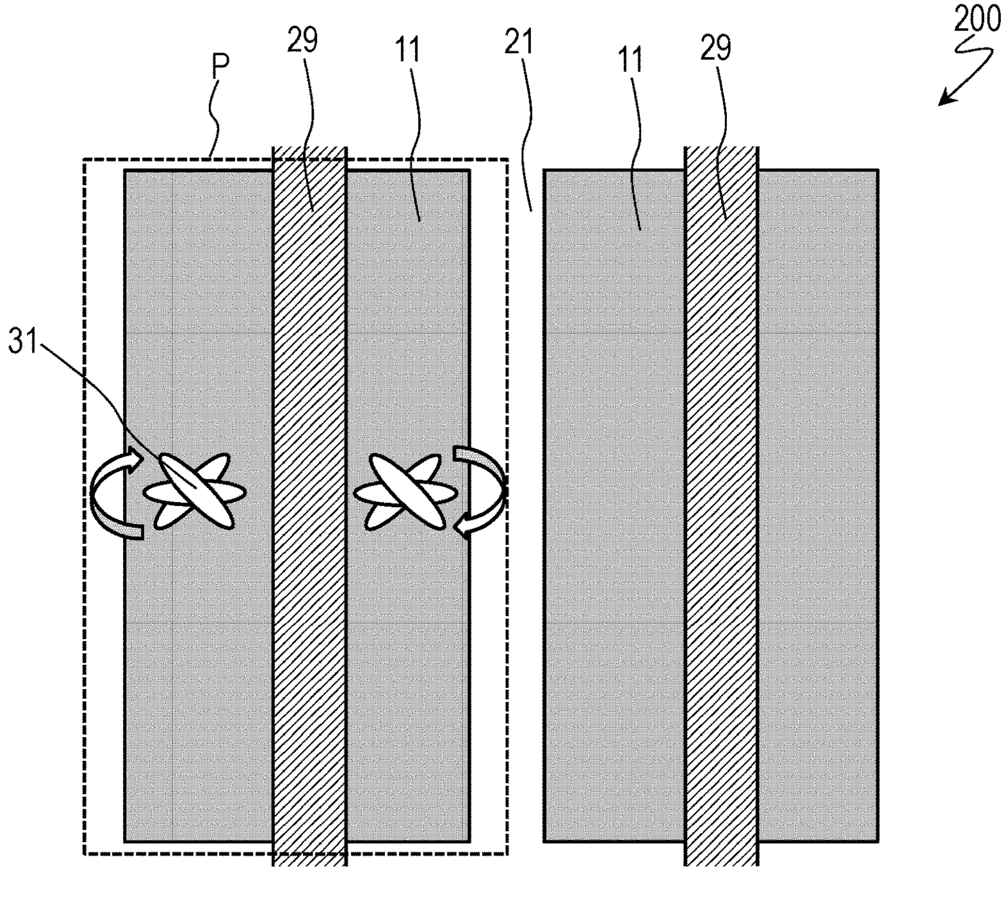
FIG. 8 is a plan view schematically illustrating the liquid crystal display apparatus 200 and illustrates the regions corresponding to two pixels P.

FIGS. 7 and 8 illustrate a liquid crystal display apparatus 200 in an embodiment. FIGS. 7 and 8 are a sectional view and a plan view schematically illustrating the liquid crystal display apparatus 200, respectively.

FIGS. 7 and 8 illustrate regions corresponding two pixels P which are adjacent to each other in the row direction.

The liquid crystal display apparatus 200 illustrated in FIGS. 7 and 8 is different from the liquid crystal display apparatus 100 in Embodiment 1 in that the front substrate 20 has a rib 29 as the anchoring structure. The rib 29 is formed on the second electrode 21. The rib 29 applies an anchoring force to the liquid crystal molecules 31 not only when a voltage is applied to the liquid crystal layer 30, but also when a voltage is not applied to the liquid crystal layer 30. The rib 29 is formed of a dielectric material (for example, photosensitive resin material). The dielectric constant of the rib 29 is about 3 to 4, for example.

The rib 29 extends in a predetermined direction. Specifically, the rib 29 extends in the column direction (up-and-down direction in FIG. 8). The width of the rib 29 is, for example, 5 μm to 10 μm, and it is not limited thereto. The height of the rib 29 is, for example, 0.5 μm to 1.5 μm, and it is not limited thereto.

In the example illustrated in FIGS. 7 and 8, one rib 29 is formed for each pixel column. The rib 29 is positioned in the vicinity of the center of each pixel P in the row direction. Each of the pretilt orientation determined by the first horizontal alignment film 12 and the pretilt orientation determined by the second horizontal alignment film 22 forms an angle of about 45° to the direction in which the rib 29 extends.

Also in the liquid crystal display apparatus 200 in the embodiment, the pretilt orientations of the liquid crystal molecules 31 are determined by the first horizontal alignment film 12 and the second horizontal alignment film 22 as the photoalignment films. The pretilt angles greater than 0° are imparted to the liquid crystal molecules 31 by the first alignment sustaining layer 18 and the second alignment sustaining layer 28. Therefore, as illustrated in FIG. 7, it is possible to realize a horizontal alignment state in which the pretilt angle is greater than 0°.

Although the light shielding layer is not illustrated in FIG. 7, similar to the liquid crystal display apparatus 100 in Embodiment 1, a light shielding layer overlapping the rib 29 as anchoring means is preferably provided. Since such a light shielding layer is provided, it is possible to suppress degradation of display quality caused by an occurrence of the disclination line.

Figure 9:
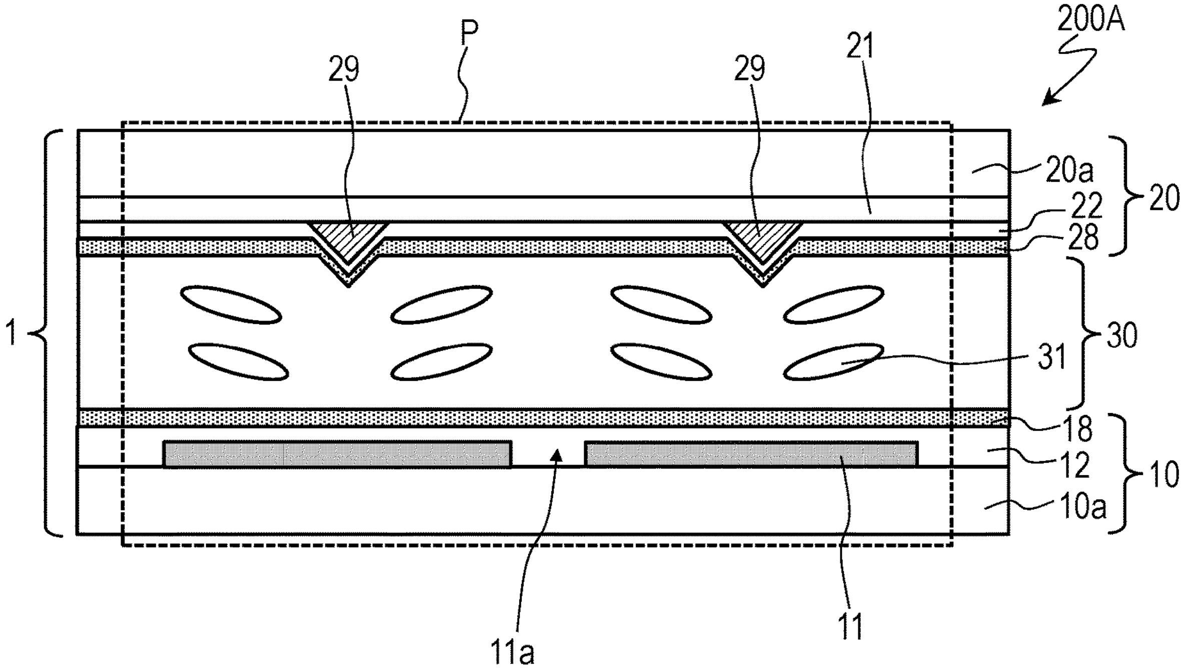
FIG. 9 is a sectional view schematically illustrating a liquid crystal display apparatus 200A according to still another embodiment of the present invention and illustrates a region corresponding to one pixel P.

FIG. 9 illustrates another liquid crystal display apparatus 200A in the embodiment. FIG. 9 is a sectional view schematically illustrating the liquid crystal display apparatus 200A and illustrates a region corresponding to one pixel P.

In the liquid crystal display apparatus 200A illustrated in FIG. 9, not only the front substrate 20 has an anchoring structure (rib 29), but also the back substrate 10 includes anchoring means. Here, the anchoring structure of the back substrate 10 is a slit 11*a* formed in the first electrode 11. The slit 11*a* extends in the same direction as the rib 29.

Figure 10:
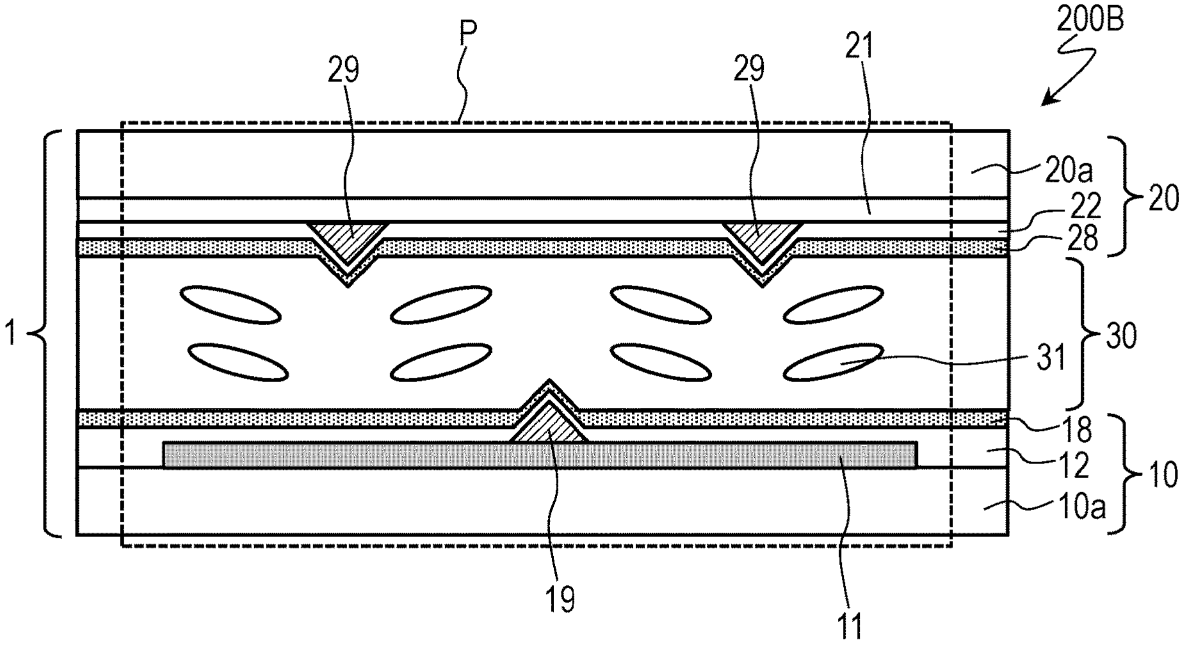
FIG. 10 is a sectional view schematically illustrating a liquid crystal display apparatus 200B according to still another embodiment of the present invention and illustrates a region corresponding to one pixel P.

FIG. 10 illustrates still another liquid crystal display apparatus 200B in the embodiment. FIG. 10 is a sectional view schematically illustrating the liquid crystal display apparatus 200B and illustrates a region corresponding to one pixel P.

The liquid crystal display apparatus 200B illustrated in FIG. 10 is different from the liquid crystal display apparatus 200A illustrated in FIG. 9 in that the back substrate 10 has a rib 19 as the anchoring structure. The rib 19 is provided on the first electrode 11. The width of the rib 19 is, for example, 5 μm to 10 μm, and it is not limited thereto. The height of the rib 19 is, for example, 0.5 μm to 1.5 μm, and it is not limited thereto.

Embodiment 3

Figure 11:
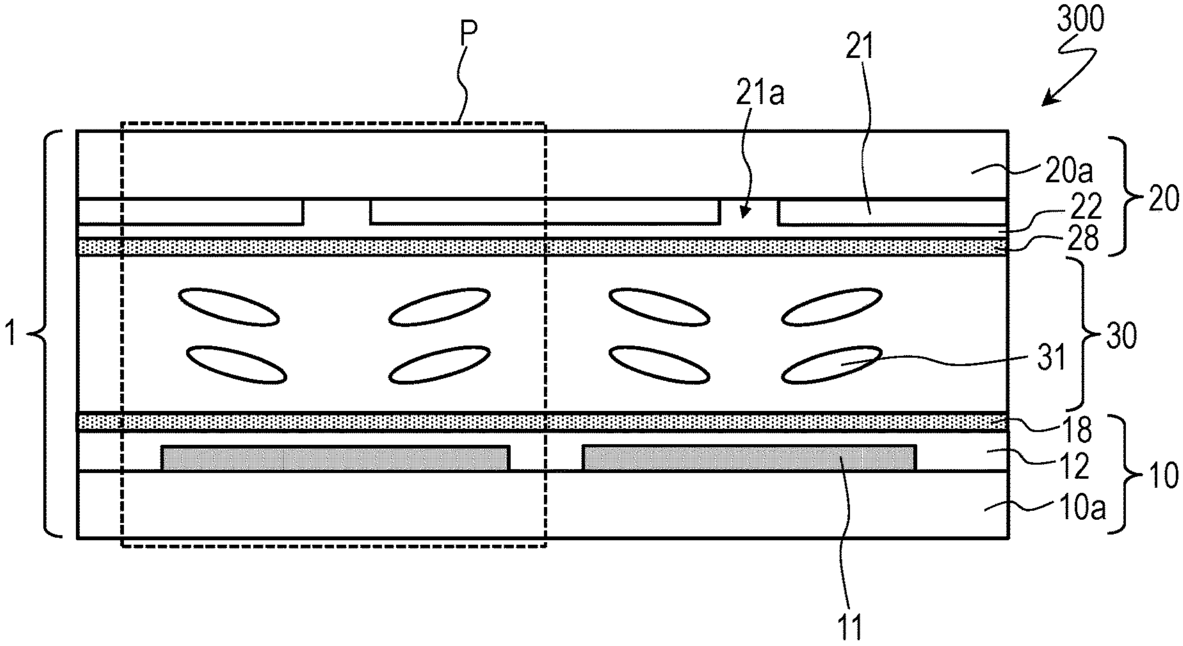
FIG. 11 is a sectional view schematically illustrating a liquid crystal display apparatus 300 according to still another embodiment of the present invention and illustrates regions corresponding to two pixels P.
Figure 12:
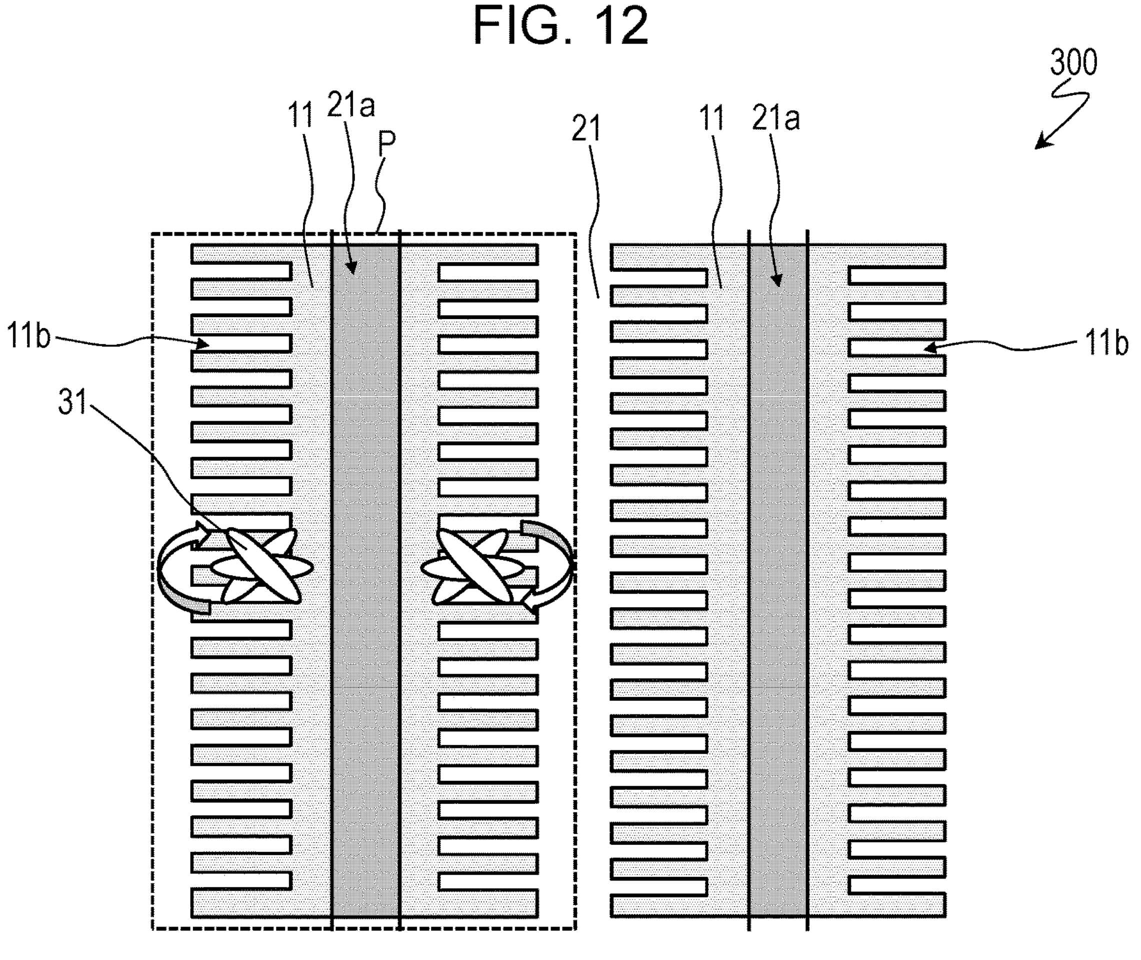
FIG. 12 is a plan view schematically illustrating the liquid crystal display apparatus 300 and illustrates regions corresponding to two pixels P.

FIGS. 11 and 12 illustrate a liquid crystal display apparatus 300 in an embodiment. FIGS. 11 and 12 are a sectional view and a plan view schematically illustrating the liquid crystal display apparatus 300, respectively. FIGS. 11 and 12 illustrate regions corresponding two pixels P which are adjacent to each other in the row direction.

The liquid crystal display apparatus 300 illustrated in FIGS. 11 and 12 is different from the liquid crystal display apparatus 100 in Embodiment 1 in that the first electrode 11 includes a plurality of slits 11*b* extending in a direction (here, row direction) which is substantially orthogonal to the direction in which the anchoring structure (slit 21*a* of second electrode 21) extends.

The slit 11*b* has a width which is smaller than the width of the slit 21*a* of the second electrode 21. Therefore, in the following descriptions, the slit lib is also referred to as "a fine slit". The width of the fine slit 11*b* is, for example, 2 μm to 5 μm, and it is not limited thereto.

When a voltage is applied to the liquid crystal layer 30, the slit 21*a* of the second electrode 21 applies an anchoring force causing the liquid crystal molecules 31 to be tilted in the direction orthogonal to the direction in which the slit 21*a* extends. Regarding this, when the voltage is applied to the liquid crystal layer 30, the fine slit 11*b* of the first electrode 11 applies an anchoring force causing the liquid crystal molecules 31 to be tilted in a direction in which the fine slit 11*b* extends. Thus, the anchoring force of the fine slit 11*b* in the first electrode 11 matches with the anchoring force of the slit 21*a* in the second electrode 21. Therefore, since the fine slit 11*b* is formed, an effect of improving alignment stability and a response speed is obtained.

Figure 13:
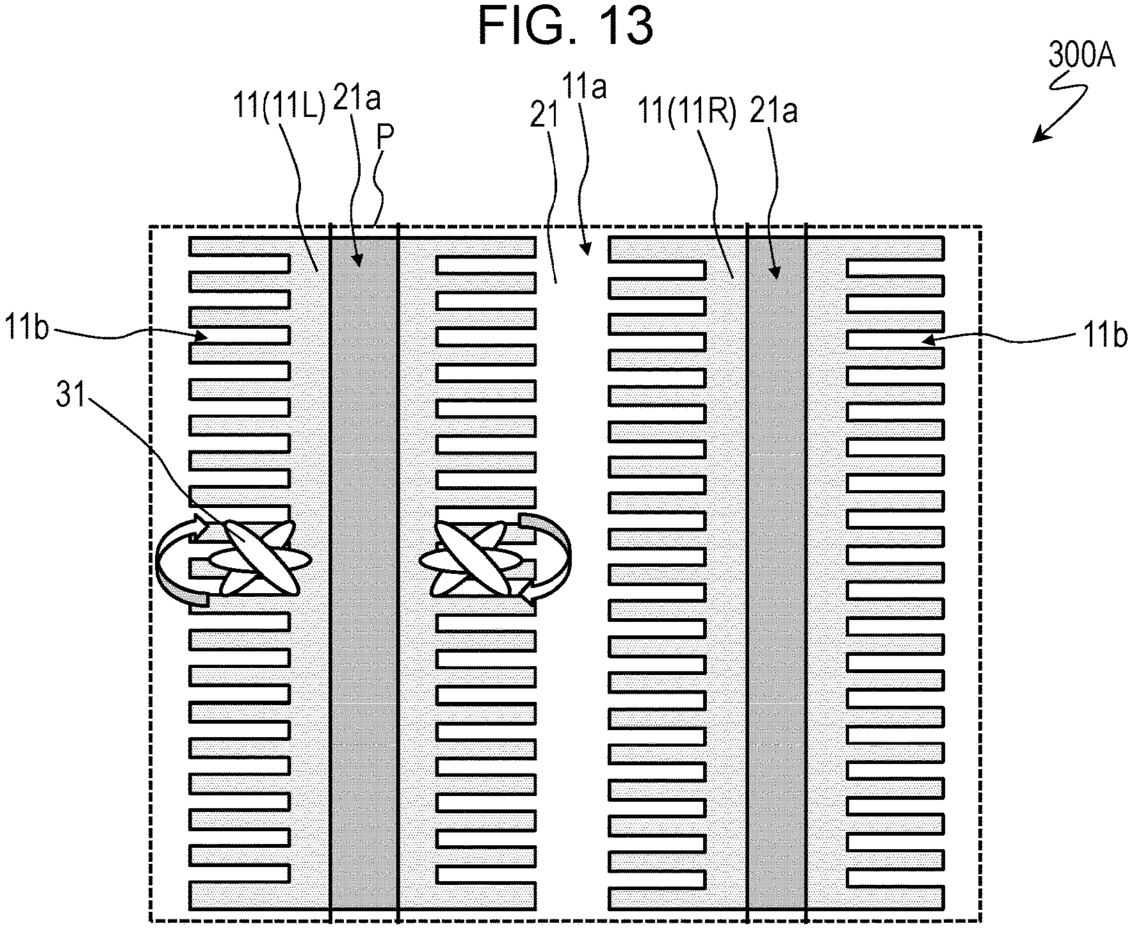
FIG. 13 is a plan view schematically illustrating a liquid crystal display apparatus 300A according to still another embodiment of the present invention and illustrates a region corresponding to one pixel P.

FIG. 13 illustrates another liquid crystal display apparatus 300A in the embodiment. FIG. 13 is a plan view schematically illustrating the liquid crystal display apparatus 300A and illustrates a region corresponding to one pixel P.

The liquid crystal display apparatus 300A illustrated in FIG. 13 is different from the liquid crystal display apparatus 300 illustrated in FIGS. 11 and 12 in that the first electrode 11 has a slit 11*a* extending in the same direction as the slit 21*a* of the second electrode 21 in addition to the fine slit 11*b*. The slit 11*a* of the first electrode 11 extends in the same direction as the slit 21*a* of the second electrode 21 and functions as the anchoring structure.

FIG. 13 illustrates that the right half 11R and the left half 11L of the first electrode 11 are separated from each other, but the right half and the left half of the first electrode may continue by portions of the halves.

Embodiment 4

Figure 14:
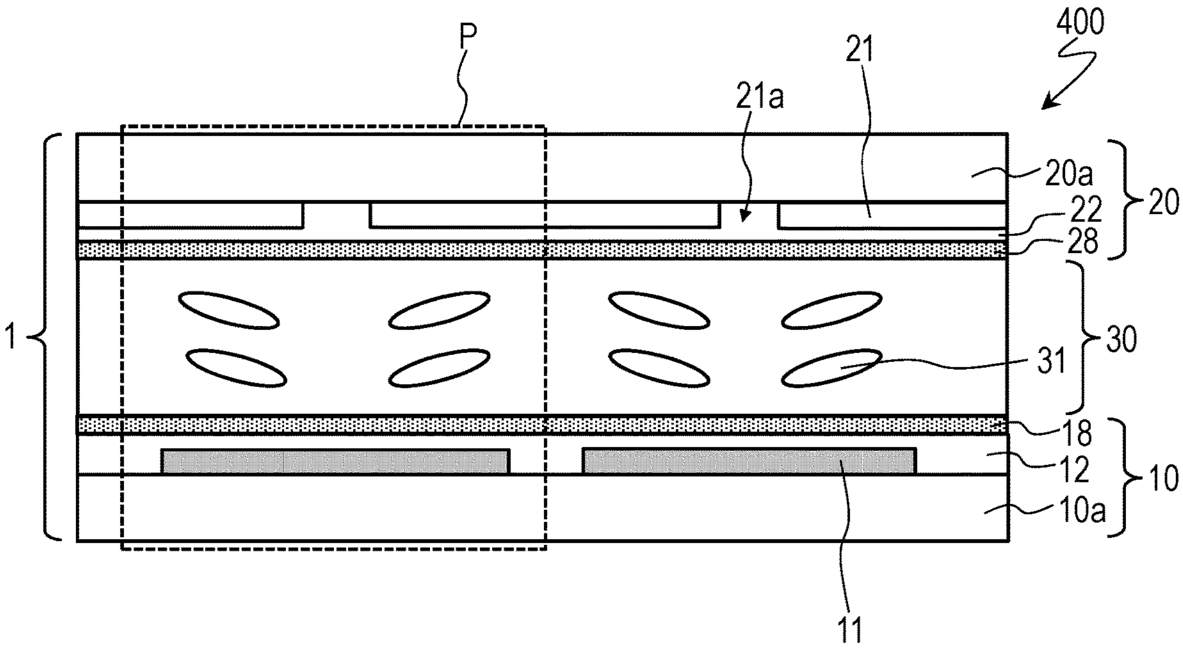
FIG. 14 is a sectional view schematically illustrating a liquid crystal display apparatus 400 according to still another embodiment of the present invention and illustrates regions corresponding to two pixels P.
Figure 15:
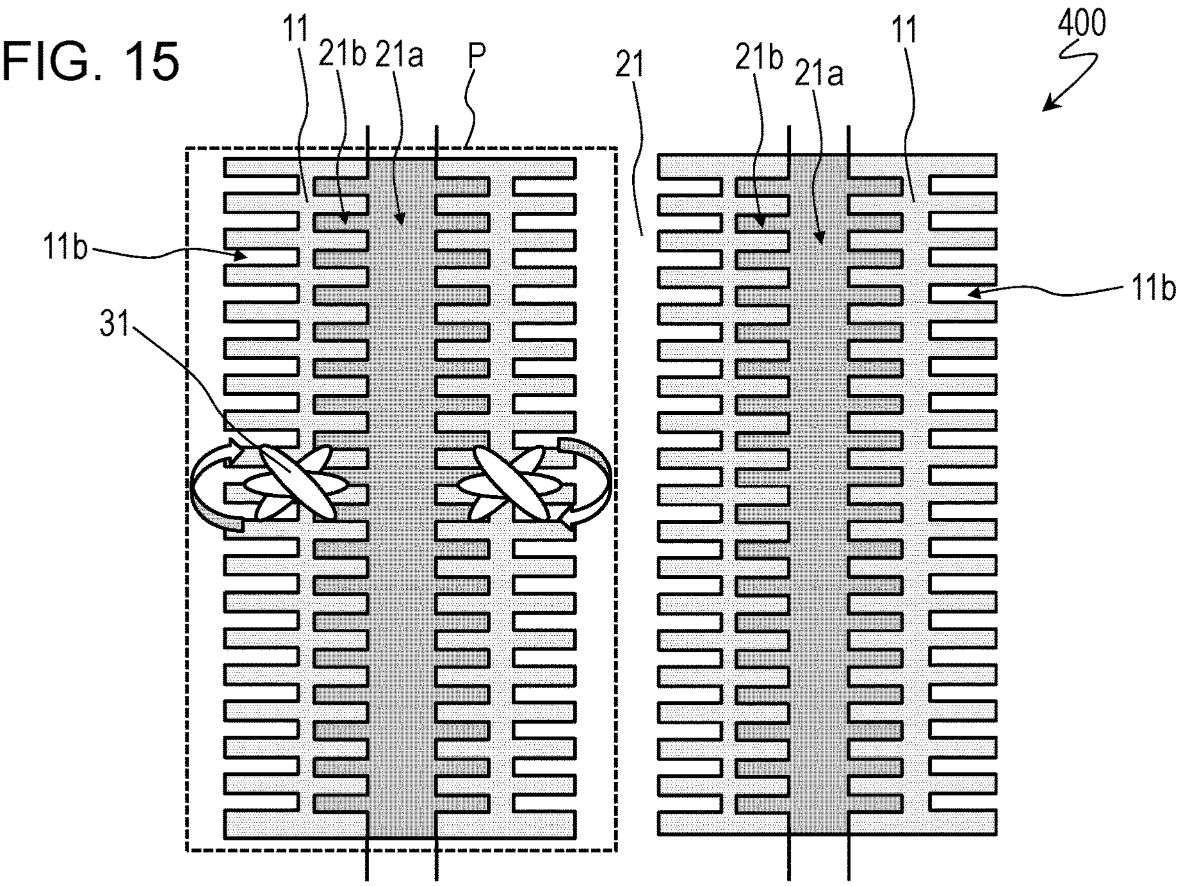
FIG. 15 is a plan view schematically illustrating the liquid crystal display apparatus 400 and illustrates regions corresponding to two pixels P.

FIGS. 14 and 15 illustrate a liquid crystal display apparatus 400 in an embodiment. FIGS. 14 and 15 are a sectional view and a plan view schematically illustrating the liquid crystal display apparatus 400, respectively. FIGS. 14 and 15 illustrate regions corresponding two pixels P which are adjacent to each other in the row direction.

The liquid crystal display apparatus 400 illustrated in FIGS. 14 and 15 is different from the liquid crystal display apparatus 300 in Embodiment 3 in that the second electrode 21 includes a plurality of slits 21*b* extending in the direction (here, row direction) which is substantially orthogonal to the direction in which the slit 21*a* extends.

The slit 21*b* has a width smaller than the slit 21*a*. Therefore, in the following descriptions, the slit 21*b* is also referred to as "a fine slit". The width of the fine slit 21*b* is, for example, 2 μm to 5 μm, and it is not limited thereto.

Similar to the fine slit 11*b* of the first electrode 11, when a voltage is applied to the liquid crystal layer 30, the fine slit 21*b* of the second electrode 21 applies an anchoring force causing the liquid crystal molecules 31 to be tilted in the direction in which the fine slit 21*b* extends. Therefore, since the fine slit 21*b* is formed, an effect of further improving alignment stability and a response speed is obtained.

Figure 16:
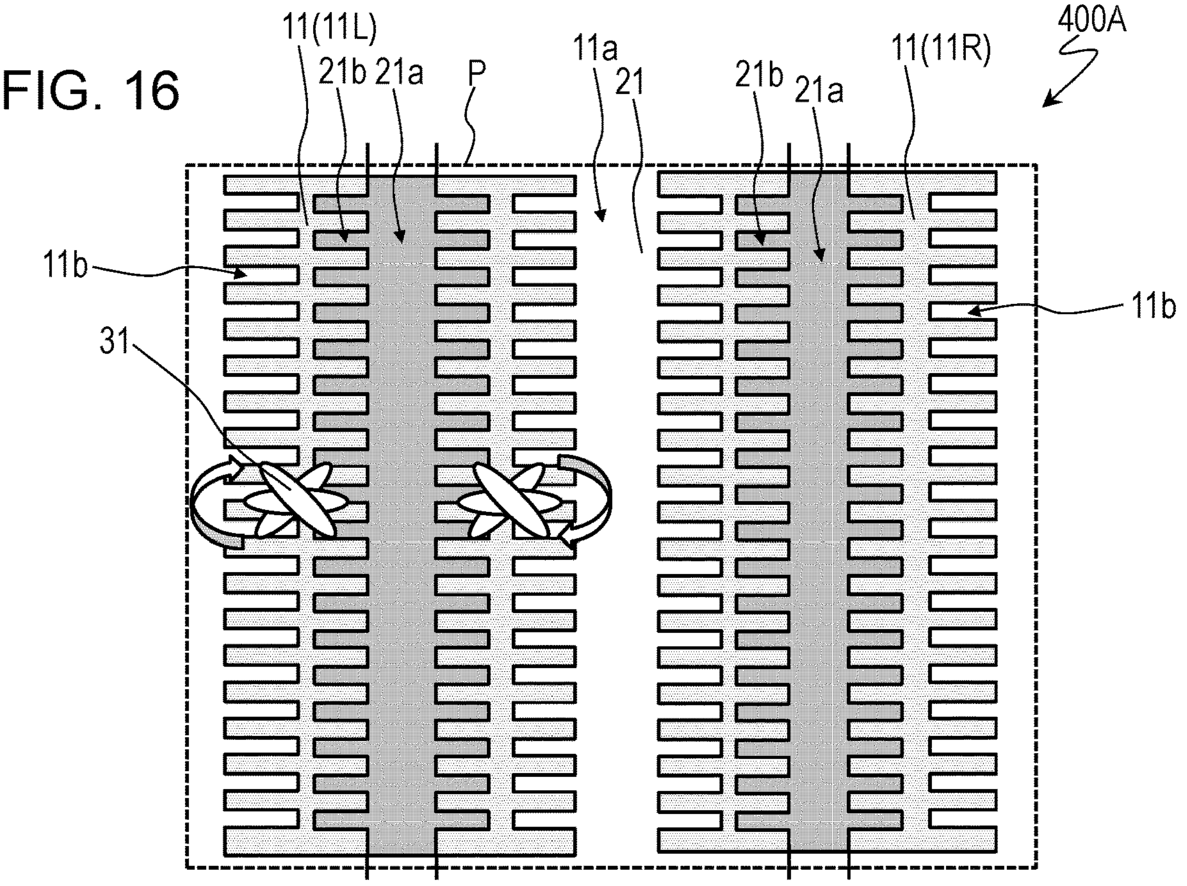
FIG. 16 is a plan view schematically illustrating a liquid crystal display apparatus 400A according to still another embodiment of the present invention and illustrates a region corresponding to one pixel P.

FIG. 16 illustrates another liquid crystal display apparatus 400A in the embodiment. FIG. 16 is a plan view schematically illustrating the liquid crystal display apparatus 400A and illustrates a region corresponding to one pixel P.

The liquid crystal display apparatus 400A illustrated in FIG. 16 is different from the liquid crystal display apparatus 400 illustrated in FIGS. 14 and 15 in that the first electrode 11 has a slit 11*a* extending in the same direction as the slit 21*a* of the second electrode 21 in addition to the fine slit lib. The slit 11*a* functions as the anchoring structure.

FIG. 16 illustrates that the right half 11R and the left half 11L of the first electrode 11 are separated from each other, but the right half and the left half of the first electrode may continue by portions of the halves.

Embodiment 5

Figure 17:
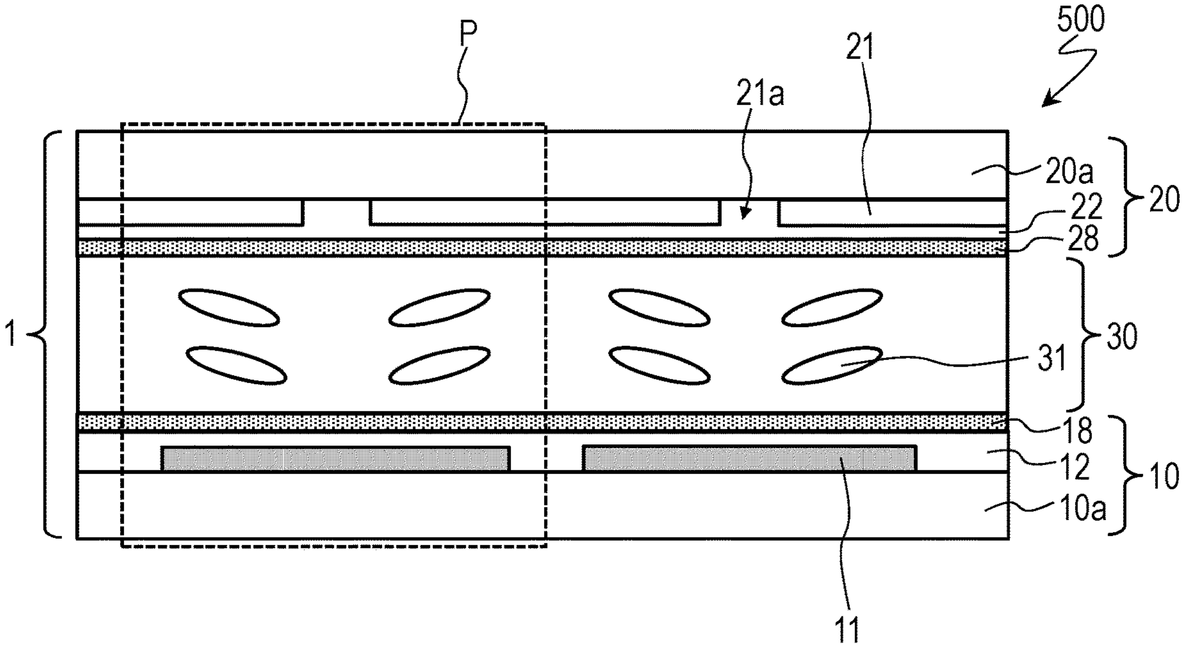
FIG. 17 is a sectional view schematically illustrating a liquid crystal display apparatus 500 according to still another embodiment of the present invention and illustrates regions corresponding to two pixels P.
Figure 18:
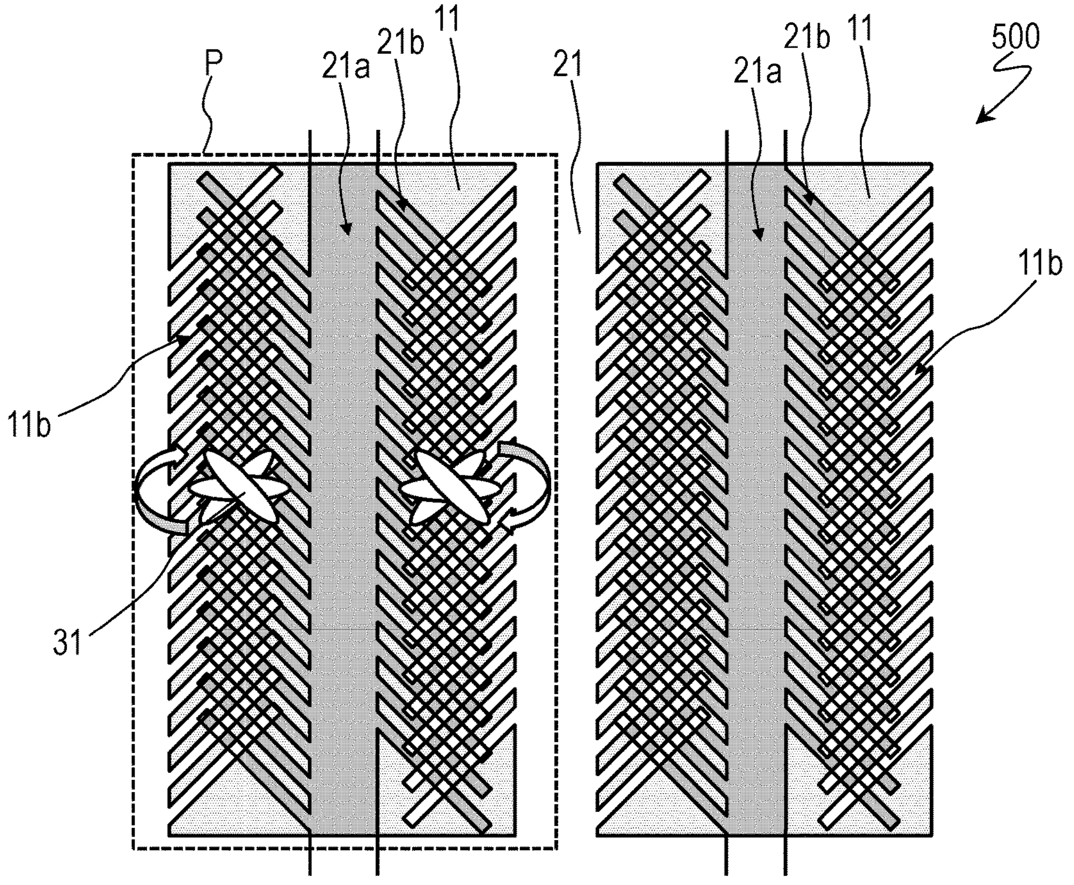
FIG. 18 is a plan view schematically illustrating the liquid crystal display apparatus 500 and illustrates the regions corresponding to the two pixels P.

FIGS. 17 and 18 illustrate a liquid crystal display apparatus 500 in an embodiment. FIGS. 17 and 18 are a sectional view and a plan view schematically illustrating the liquid crystal display apparatus 500, respectively. FIGS. 17 and 18 illustrate regions corresponding two pixels P which are adjacent to each other in the row direction.

In the liquid crystal display apparatus 500 illustrated in FIGS. 17 and 18, the first electrode 11 includes a plurality of slits (fine slits) 11*b* which extend in a direction intersecting the direction in which the slit 21*a* of second electrode 21 extends. The slits 11*b* have a width smaller than the width of the slit 21*a*. The second electrode 21 includes a plurality of slits (fine slits) 21*b* which extend in a direction intersecting the direction in which the slit 21*a* of second electrode 21 extends. The slits 21*b* have a width smaller than the width of the slit 21*a*.

The direction in which the fine slit 11*b* of the first electrode 11 extends is substantially parallel to the pretilt orientation determined by the first horizontal alignment film 12. The direction in which the fine slit 21*b* of the second electrode 21 extends is substantially parallel to the pretilt orientation determined by the second horizontal alignment film 22.

Since the above-described fine slits 11*b* and 21*b* (that apply an anchoring force causing the liquid crystal molecules 31 to be tilted in a direction which is substantially parallel to the pretilt orientation) are formed in the first electrode 11 and the second electrode 21, the effect of further improving alignment stability and a response speed is also obtained.

Figure 19:
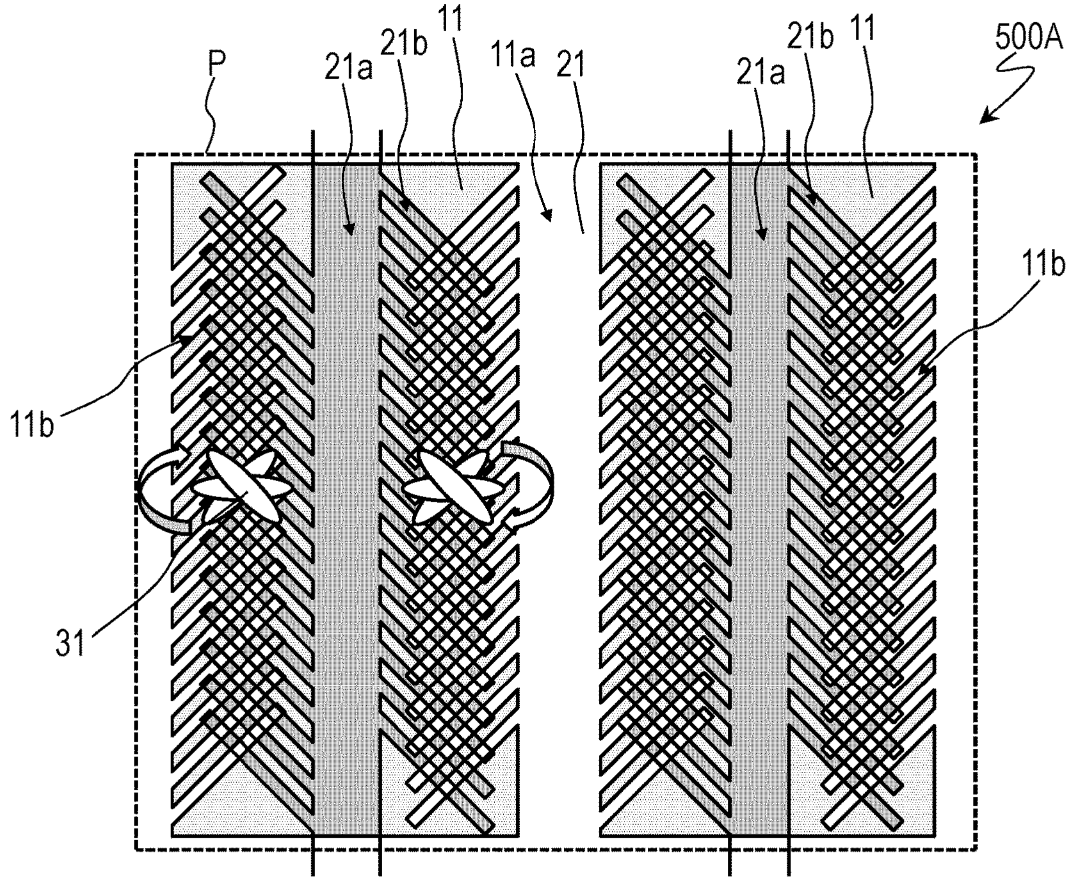
FIG. 19 is a plan view schematically illustrating a liquid crystal display apparatus 500A according to still another embodiment of the present invention and illustrates a region corresponding to one pixel P.

FIG. 19 illustrates another liquid crystal display apparatus 500A in the embodiment. FIG. 19 is a plan view schematically illustrating the liquid crystal display apparatus 500A and illustrates a region corresponding to one pixel P.

The liquid crystal display apparatus 500A illustrated in FIG. 19 is different from the liquid crystal display apparatus 500 illustrated in FIGS. 17 and 18 in that the first electrode 11 has a slit 11*a* extending in the same direction as the slit 21*a* of the second electrode 21 in addition to the fine slit 11*b*. The slit 11*a* functions as the anchoring structure.

FIG. 19 illustrates that the right half 11R and the left half 11L of the first electrode 11 are separated from each other, but the right half and the left half of the first electrode may continue by portions of the halves.

Embodiment 6

Figure 20:
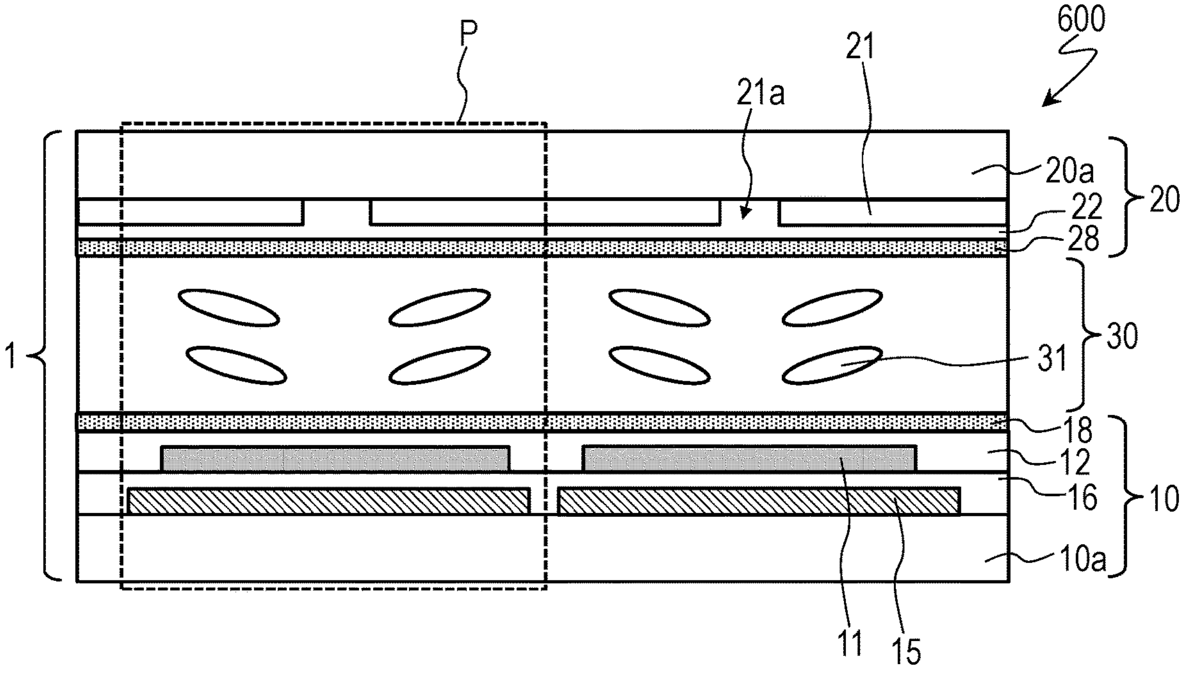
FIG. 20 is a sectional view schematically illustrating a liquid crystal display apparatus 600 according to still another embodiment of the present invention and illustrates regions corresponding to two pixels P.
Figure 21:
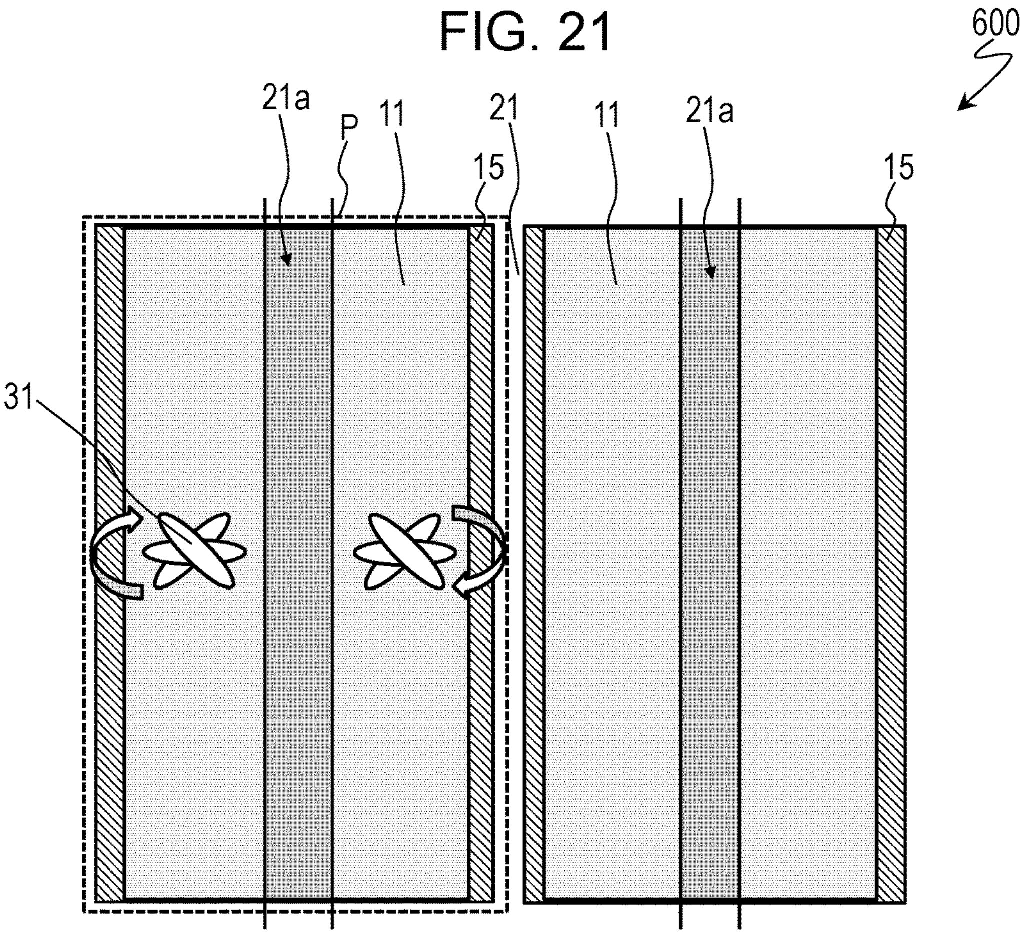
FIG. 21 is a plan view schematically illustrating the liquid crystal display apparatus 600 and illustrates the regions corresponding to the two pixels P.

FIGS. 20 and 21 illustrate a liquid crystal display apparatus 600 in an embodiment. FIGS. 20 and 21 are a sectional view and a plan view schematically illustrating the liquid crystal display apparatus 600, respectively. FIGS. 20 and 21 illustrate regions corresponding two pixels P which are adjacent to each other in the row direction.

The liquid crystal display apparatus 600 illustrated in FIGS. 20 and 21 is different from the liquid crystal display apparatus 100 in Embodiment 1 in that the back substrate 10 includes not only the first electrode 11 but also a third electrode 15. The third electrode 15 generates a transverse electric field (fringe field) in the liquid crystal layer 30 along with the first electrode 11. The third electrode 15 is provided to be positioned below the first electrode 11 with the insulating layer 16 interposed between the first electrode and the third electrode. In other words, the first electrode 11 is provided to be positioned above the third electrode 15 with the insulating layer 16 interposed between the first electrode and the third electrode. The third electrode 15 is provided for each pixel P. Another TFT (not illustrated) different from the TFT connected to the first electrode 11 is provided for each pixel P. The third electrode 15 is electrically connected to the drain electrode of this TFT.

Each pixel P in the liquid crystal display apparatus 600 having the above-described electrode structure can be switched between a black display state and a white display state. In the black display state, black display is performed in a state where a vertical electric field is generated in the liquid crystal layer 30. In the white display state, white display is performed in a state where a transverse electric field is generated in the liquid crystal layer 30.

In the liquid crystal display apparatus 600, the vertical electric field is generated in the liquid crystal layer 30 in the black display state, and the transverse electric field is generated in the liquid crystal layer 30 in the white display state. Thus, in both cases of falling (transition from the white display state to the black display state) and rising (transition from the black display state to the white display state), it is possible to cause a dielectric torque generated by applying a voltage to act on the liquid crystal molecules 31. Therefore, excellent response characteristics are obtained.

In the step of forming the first alignment sustaining layer 18 and the second alignment sustaining layer 28 when the liquid crystal display apparatus 600 is manufactured, the third electrode 15 of the back substrate 10 and the second electrode 21 of the front substrate 20 may be electrically connected to have the same potential, and a voltage may be applied between the third electrode 15 and the second electrode 21, and the first electrode 11.

Embodiment 7

Figure 22:
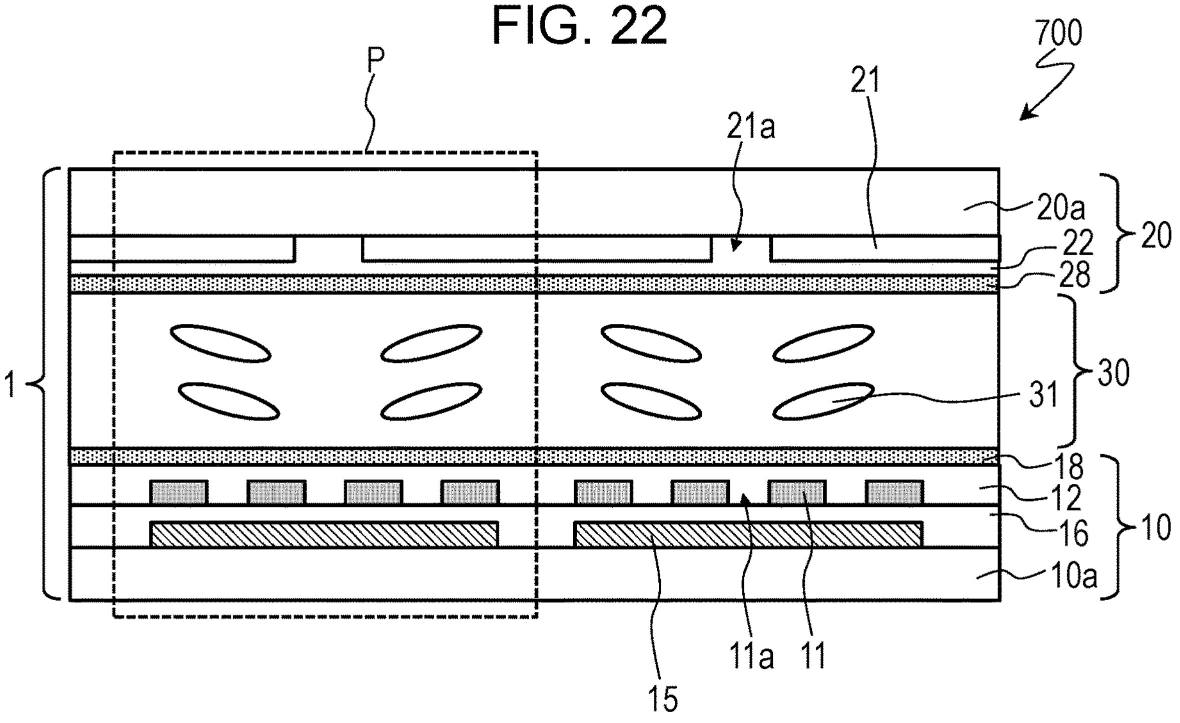
FIG. 22 is a sectional view schematically illustrating a liquid crystal display apparatus 700 according to still another embodiment of the present invention and illustrates regions corresponding to two pixels P.
Figure 23:
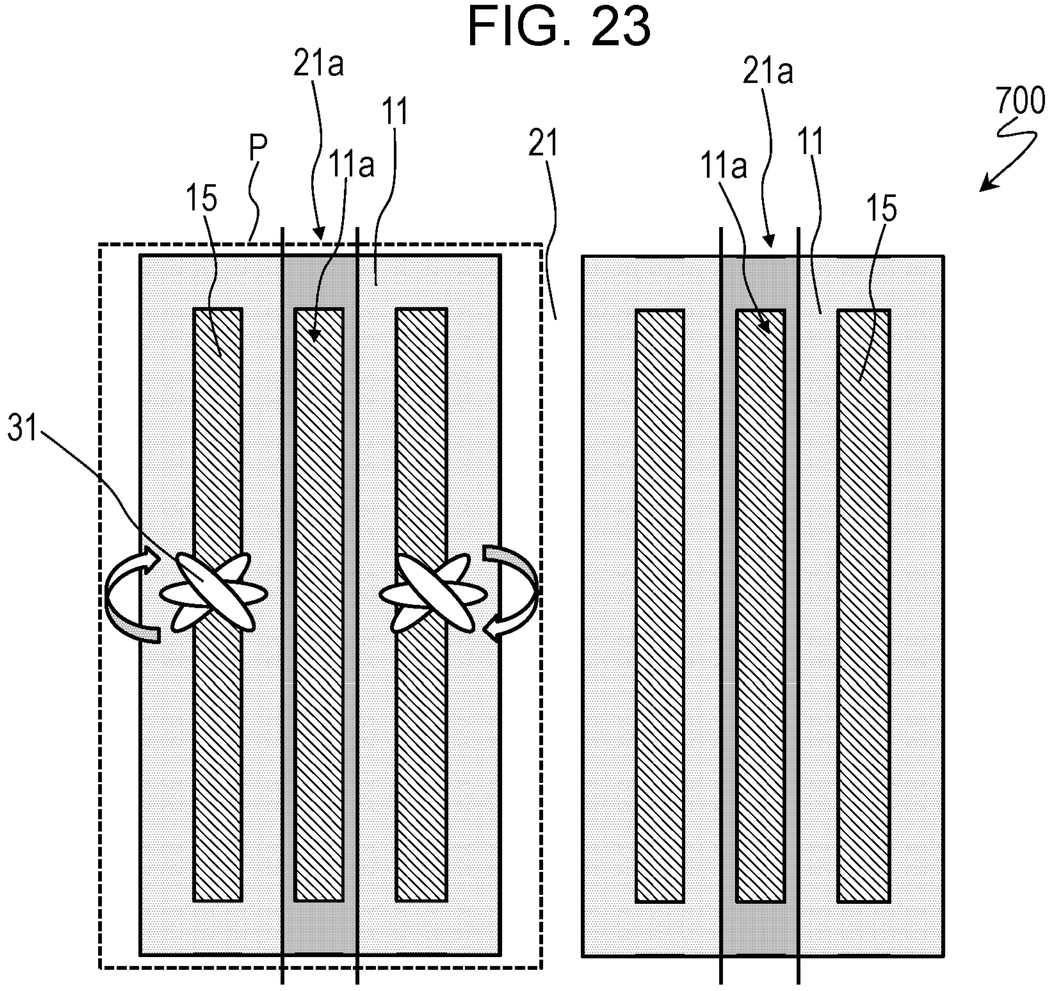
FIG. 23 is a plan view schematically illustrating the liquid crystal display apparatus 700 and illustrates the regions corresponding to the two pixels P.

FIGS. 22 and 23 illustrate a liquid crystal display apparatus 700 in an embodiment. FIGS. 22 and 23 are a sectional view and a plan view schematically illustrating the liquid crystal display apparatus 700, respectively. FIGS. 22 and 23 illustrate regions corresponding two pixels P which are adjacent to each other in the row direction.

The liquid crystal display apparatus 700 illustrated in FIGS. 22 and 23 is different from the liquid crystal display apparatus 600 in Embodiment 6 in that the first electrode 11 includes the slit 11*a* and the third electrode 15 is provided for each pixel P. The slit 11*a* of the first electrode 11 extends in the same direction as the slit 21*a* of the second electrode 21 and functions as the anchoring structure.

Similar to the pixel P in the liquid crystal display apparatus 600 in Embodiment 6, each pixel P in the liquid crystal display apparatus 700 can be switched between the black display state in which black display is performed in a state where the vertical electric field is generated in the liquid crystal layer 30 and the white display state in which white display is performed in a state where the transverse electric field is generated in the liquid crystal layer 30. Therefore, in the liquid crystal display apparatus 700, in both cases of falling and rising, it is possible to cause a dielectric torque generated by applying a voltage to act on the liquid crystal molecules 31, and thus excellent response characteristics are obtained.

In the liquid crystal display apparatus 700 in the embodiment, the slit 11*a* is formed in the first electrode 11. Thus, it is possible to cause a transverse electric field (fringe field) to act on a region in a pixel P, which is larger than that in the liquid crystal display apparatus 600 in Embodiment 6.

(See-Through Display)

In the liquid crystal display apparatuses 600 and 700 in Embodiments 6 and 7, high responsiveness is realized by causing an anchoring force generated by an electric field to act on the liquid crystal molecules in both cases of rising and falling. In the specification of this application, a display mode as follows is referred to as "an on-and-on mode". This display mode is realized by an electrode structure which is included in the liquid crystal display apparatuses 600 and 700, and may perform switching between a vertical electric field and a transverse electric field and generate the switched electric field in the liquid crystal layer.

The liquid crystal display apparatus in the on-and-on mode is suitably used as a see-through display. In recent years, the see-through display has attracted attentions as a display apparatus for information display or digital signage. In the see-through display, the background (back surface side of a display panel) is seen through. Thus, display of overlapping information displayed in the display panel and the background is possible. Therefore, the see-through display is excellent in appeal effect and eye catching effect. It is also proposed to use the see-through display for showcases or show windows.

In a case using the liquid crystal display apparatus as the see-through display, there is a problem of low light utilization efficiency. A color filter or a polarizer provided in a general liquid crystal display apparatus causes low light utilization efficiency of the liquid crystal display apparatus. The color filter and the polarizer absorb light having a specific wavelength range or light having a specific polarizing direction.

Using a color-field sequential liquid crystal display apparatus is considered. In the color-field sequential method, color display is performed by switching the color of light with which a liquid crystal display panel is irradiated from a lighting element in time division. Therefore, the color filter is not required, and thus light utilization efficiency is improved. However, in the color-field sequential method, the liquid crystal display apparatus requires high responsiveness.

Figure 24:
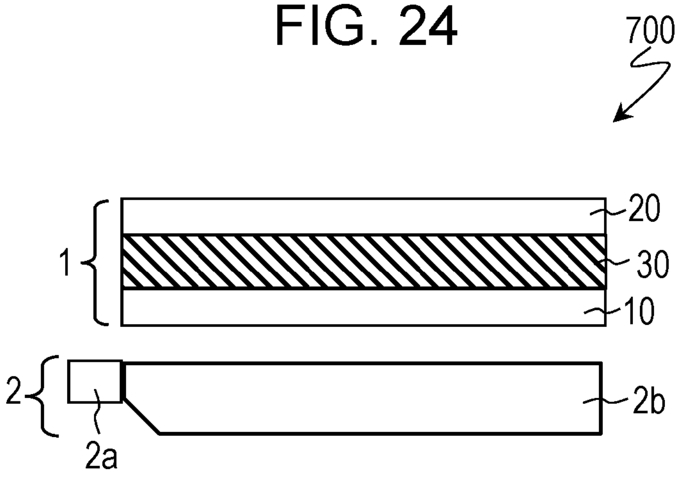
FIG. 24 is a sectional view illustrating an example of a configuration using the liquid crystal display apparatus 700 as a see-through display.

The liquid crystal display apparatus in the on-and-on mode has excellent response characteristics, and thus is suitably used as the see-through display. FIG. 24 illustrates an example of a configuration in which the liquid crystal display apparatus 700 in Embodiment 7 is used as a see-through display.

In the example illustrated in FIG. 24, the liquid crystal display apparatus 700 includes a liquid crystal display panel 1 and a lighting element 2, and performs color display with a color-field sequential method.

The lighting element (may also be referred to as "a backlight") 2 is disposed on the back surface side of the liquid crystal display panel 1. The lighting element 2 can perform switching between plural kinds of color light including red light, green light, and blue light, and irradiate the liquid crystal display panel 1 with the switched light.

For example, as illustrated in FIG. 24, a backlight of an edge light type can be used as the lighting element 2. The backlight 2 of an edge light type includes a light source unit 2*a* and a light guide plate 2*b*. The light source unit 2*a* may emit plural kinds of color light including red light, green light, and blue light. For example, the light source unit 2*a* includes a red LED, a green LED, and a blue LED as light sources. The light guide plate 2*b* guides color light emitted from the light source unit 2*a* to the liquid crystal display panel 1.

The liquid crystal display apparatus 100 performs color display with a color-field sequential method. Therefore, the liquid crystal display panel 1 does not include a color filter.

If a liquid crystal display apparatus in the on-and-on mode is used as the see-through display, there is a problem in that the background is blurred (is viewed twice). Thus, display quality may be degraded. If each pixel P can perform switching between "the black display state" in which black display is performed in a state where a vertical electric field is generated in the liquid crystal layer 30, "the white display state" in which white display is performed in a state where a transverse electric field is generated in the liquid crystal layer 30, and "a transparent display state" in which the back surface side of the liquid crystal display panel is seen through in a state where a voltage is not applied to the liquid crystal layer 30, an occurrence of the problem that the background is seen through (is viewed twice) is prevented. More specific descriptions will be made below.

If a predetermined voltage is applied between the first electrode 11 and the third electrode 15 (that is, if a predetermined potential difference is given), a transverse electric field (fringe field) is generated in the liquid crystal layer 30. "The transverse electric field" is an electric field including a component which is substantially parallel to the substrate surface.

On the contrary, if a predetermined voltage is applied between the second electrode 21, and the first electrode 11 and the third electrode 15 (that is, if a predetermined potential difference is given), a vertical electric field is generated. "The vertical electric field" is an electric field having a direction which is substantially parallel to a normal direction to the substrate surface.

Each pixel P in the liquid crystal display apparatus 700 may perform switching between "the black display state" in which black display is performed in a state where a vertical electric field is generated in the liquid crystal layer 30, "the white display state" in which white display is performed in a state where a transverse electric field is generated in the liquid crystal layer 30, and "a transparent display state" in which the back surface side of the liquid crystal display panel 1 (that is, the background) is seen through in a state where a voltage is not applied to the liquid crystal layer 30.

The black display state, the white display state, and the transparent display state will be more specifically described below with reference to FIGS. 25(*a*) to 27(*b*).

Figure 25:
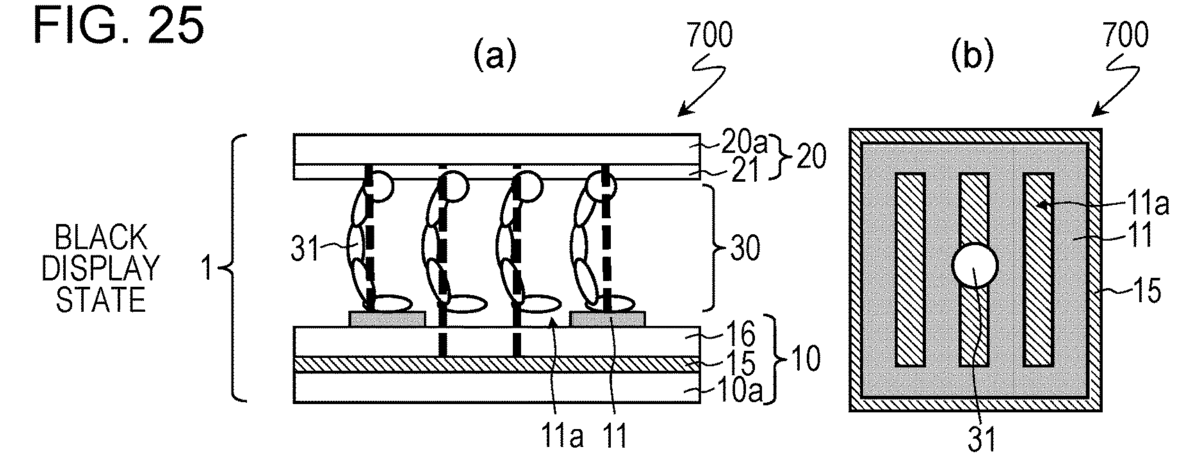
FIGS. 25(*a*) and 25(*b*) are a sectional view and a plan view illustrating an alignment state of liquid crystal molecules 31 in a black display state of the liquid crystal display apparatus 700.

FIGS. 25(*a*) and 25(*b*) illustrate an alignment state of liquid crystal molecules 31 in the black display state. In the black display state, a predetermined voltage is applied between the second electrode 21, and the first electrode 11 and the third electrode 15, and a vertical electric field is generated in the liquid crystal layer 30. FIG. 25(*a*) schematically illustrates lines of an electric force with broken lines at this time. In the black display state, as illustrated in FIGS. 25(*a*) and 25(*b*), the liquid crystal molecules 31 in the liquid crystal layer 30 are aligned to be substantially perpendicular to the substrate surface (surfaces of the back substrate 10 and the front substrate 20) (that is, aligned to be substantially parallel to a layer normal direction to the liquid crystal layer 30).

Figure 26:
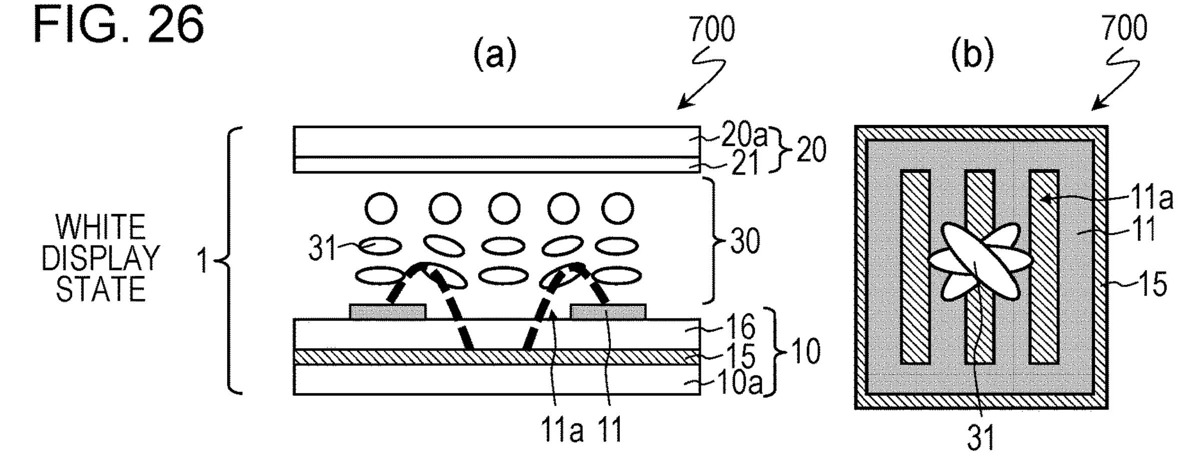
FIGS. 26(*a*) and 26(*b*) are a sectional view and a plan view illustrating the alignment state of the liquid crystal molecules 31 in a white display state of the liquid crystal display apparatus 700.

FIGS. 26(*a*) and 26(*b*) illustrate an alignment state of the liquid crystal molecules 31 in the white display state. In the white display state, a predetermined voltage is applied between the first electrode 11 and the third electrode 15, and a transverse electric field (fringe field) is generated in the liquid crystal layer 30. FIG. 26(*a*) schematically illustrates lines of an electric force with broken lines at this time. In the white display state, as illustrated in FIGS. 26(*a*) and 26(*b*), the liquid crystal molecules 31 in the liquid crystal layer 30 are aligned to be substantially parallel to the substrate surface (that is, aligned to be substantially perpendicular to the layer normal direction to the liquid crystal layer 30). More specifically, liquid crystal molecules 31 in the vicinity of the first horizontal alignment film 12 and liquid crystal molecules 31 in the vicinity of the second horizontal alignment film 22 are aligned to form an angle of about 90°. As a result, liquid crystal molecules 31 in the vicinity of the center in a thickness direction of the liquid crystal layer 30 are aligned to be substantially orthogonal to the direction in which the slit 11*a* of the first electrode 11 extends. Therefore, the average alignment direction of the liquid crystal molecules 31 in the liquid crystal layer 30 is substantially orthogonal to the direction in which the slit 11*a* extends (that is, forms an angle of about 45° to a transmission axis of each of the pair of polarizers).

Figure 27:
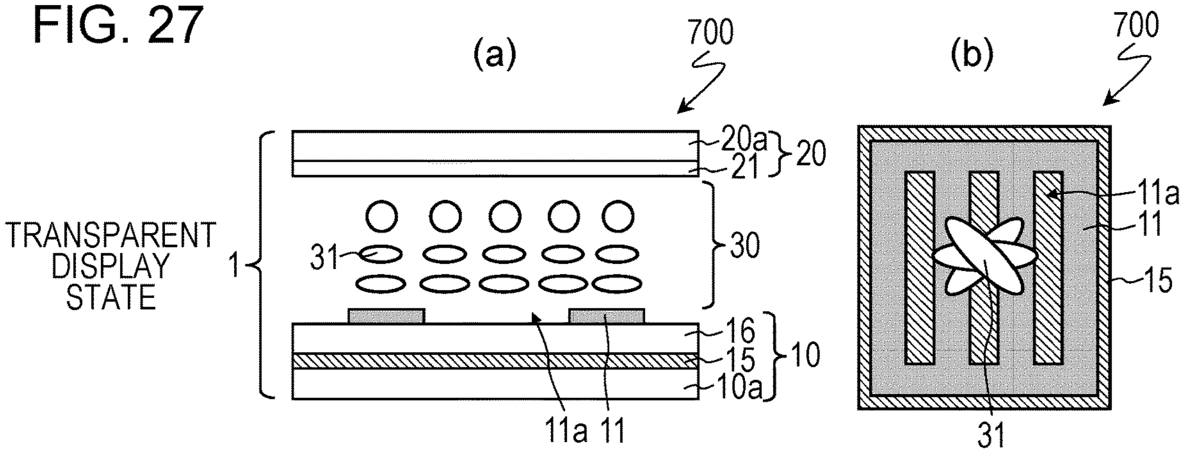
FIGS. 27(*a*) and 27(*b*) are a sectional view and a plan view illustrating the alignment state of the liquid crystal molecules 31 in a transparent display state of the liquid crystal display apparatus 700.

FIGS. 27(*a*) and 27(*b*) illustrate an alignment state of the liquid crystal molecules 31 in the transparent display state. In the transparent display state, a voltage is not applied to the liquid crystal layer 30, and thus neither a vertical electric field nor a transverse electric field is not generated in the liquid crystal layer 30. In the transparent display state, as illustrated in FIGS. 27(*a*) and 27(*b*), the liquid crystal molecules 31 in the liquid crystal layer 30 are twisted-aligned. That is, the liquid crystal molecules 31 are aligned to be substantially parallel to the substrate surface (that is, substantially perpendicular to the layer normal direction to the liquid crystal layer 30). The liquid crystal molecules 31 in the vicinity of the first horizontal alignment film 12 and liquid crystal molecules 31 in the vicinity of the second horizontal alignment film 22 are aligned to form an angle of about 90°. As a result, the liquid crystal molecules 31 in the vicinity of the center in the thickness direction of the liquid crystal layer 30 are aligned to be substantially orthogonal to the direction in which the slit 11*a* extends. Therefore, the average alignment direction of the liquid crystal molecules 31 in the liquid crystal layer 30 is substantially orthogonal to the direction in which the slit 11*a* extends (that is, forms an angle of about 45° to a transmission axis of each of the pair of polarizers). Each pixel in the liquid crystal display apparatus 100 has the highest light transmittance in the transparent display state (that is, higher than that in any of the black display state and the white display state).

Each pixel P in the liquid crystal display apparatus 700 may have a "halftone display state" indicating luminance corresponding to the half tone, in addition to the black display state, the white display state, and the transparent display state which have been described above. In the halftone display state, it is possible to realize desired transmittance by adjusting the intensity of the transverse electric field (fringe field) generated in the liquid crystal layer 30.

As described above, in the liquid crystal display apparatus 700, in a case where display of overlapping the background and information displayed in the liquid crystal display panel 1 is performed, pixels in a portion of a display region, in which displaying information is desired are in the black display state, the white display state, or the halftone display state. Pixels in other portions thereof are in the transparent display state. Switching between the display states can be performed in a manner as follows, for example.

A driving circuit for a general liquid crystal display apparatus includes an 8-bit driver IC and generates output voltages for 256 gradations (0 to 255 gradations). In the general liquid crystal display apparatus, the 0-th gradation is assigned to the black display state, the 1st to 254th gradations are assigned to the halftone display state, and the 255th gradation is assigned to the white display state.

For example, if the 0-th gradation is assigned to the black display state, the 1st to 253rd gradations are assigned to the halftone display state, the 254th gradation is assigned to the white display state, and the 255th gradation is assigned to the transparent display state, it is possible to realize switching between the black display state, the halftone display state, the white display state, and the transparent display state. It is not necessary that the transparent display state is assigned to the 255th gradation, and any gradation may be assigned to the transparent display state. Even in a case other than the 256 gradation display described above, similarly, a specific gradation may be assigned to the transparent display state.

As described above, in the liquid crystal display apparatus 700 illustrated in FIG. 24, color display is performed with a color-field sequential method. Thus, the liquid crystal display panel 1 does not require a color filter. Therefore, the light utilization efficiency is improved. In addition, since the liquid crystal display apparatus 700 can perform display in the on-and-on mode, excellent response characteristics are obtained.

In the liquid crystal display apparatus 700, each pixel P may be in the transparent display state being a state where a voltage is not applied to the liquid crystal layer 30, in addition to the black display state and the white display state. If background display is performed in the transparent display state, it is possible to prevent the occurrence of the problem in that the background is blurred (is viewed twice). Here, the reason of this problem (double blurring) occurring in a liquid crystal display apparatus in a comparative example will be described.

Figure 28:
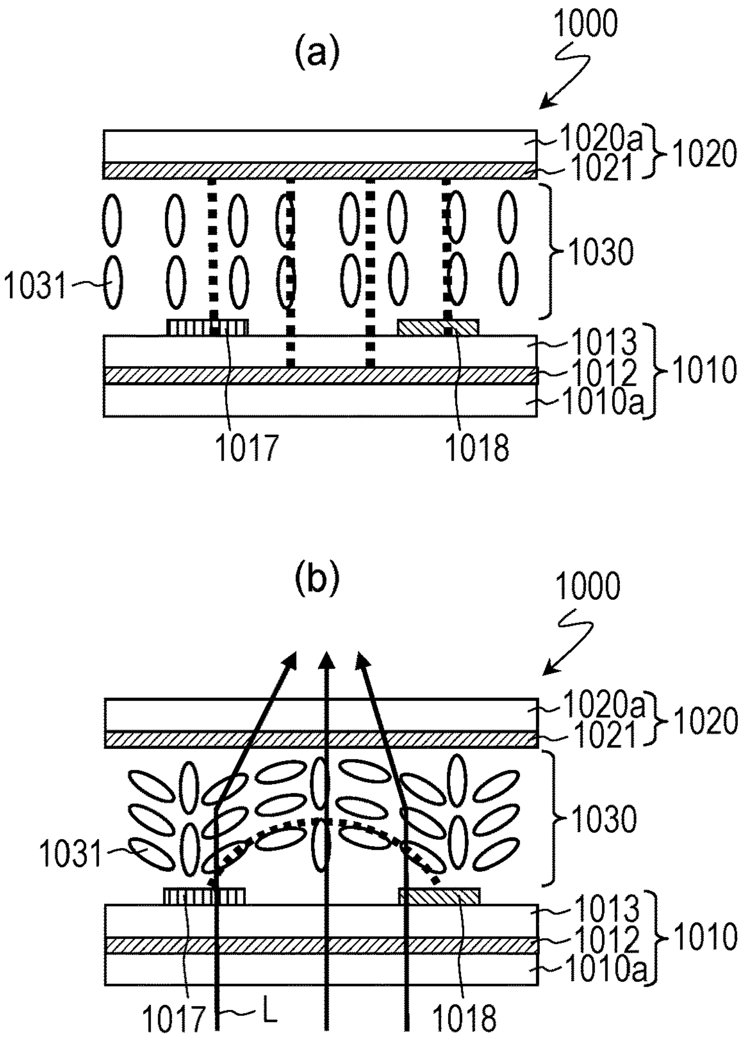
FIG. 28 is a sectional view schematically illustrating a liquid crystal display apparatus 1000 in a comparative example.

FIGS. 28(*a*) and 28(*b*) illustrate a state where black display is performed and a state where white display is performed, in a liquid crystal display apparatus 1000 in the comparative example.

The liquid crystal display apparatus 1000 includes an array substrate 1010, a counter substrate 1020, and a liquid crystal layer 1030 provided between the array substrate and the counter substrate. The array substrate 1010 includes a glass substrate 1010*a*, a lower electrode 1012, an insulating layer 1013, and a pair of comb-tooth electrodes (upper electrodes) 1017 and 1018. The lower electrode, the insulating layer, and the pair of comb-tooth electrodes are stacked on the glass substrate 1010*a* in this order. The counter substrate 1020 includes a glass substrate 1020*a* and a counter electrode 1021 formed on the glass substrate 1020*a*.

The liquid crystal layer 1030 includes liquid crystal molecules 1031 having positive dielectric anisotropy. In the liquid crystal display apparatus 1000, the liquid crystal molecules 1031 in the liquid crystal layer 1030 are in a vertical alignment state in a state where a voltage is not applied.

In the liquid crystal display apparatus 1000 in the comparative example, when black display is performed, a predetermined voltage is applied between the counter electrode 1021, and the lower electrode 1012 and the upper electrodes (pair of comb-tooth electrodes) 1017 and 1018, and thus a vertical electric field is generated in the liquid crystal layer 1030. Thus, as illustrated in FIG. 28(*a*), the liquid crystal molecules 1031 are aligned to be substantially perpendicular to the substrate surface.

In the liquid crystal display apparatus 1000 in the comparative example, when white display is performed, a predetermined voltage is applied between the pair of comb-tooth electrodes 1017 and 1018, and thus a transverse electric field is generated in the liquid crystal layer 1030. Thus, as illustrated in FIG. 28(*b*), the liquid crystal molecules 1031 have an alignment state of being inclined to a normal direction to the substrate surface.

Figure 29:
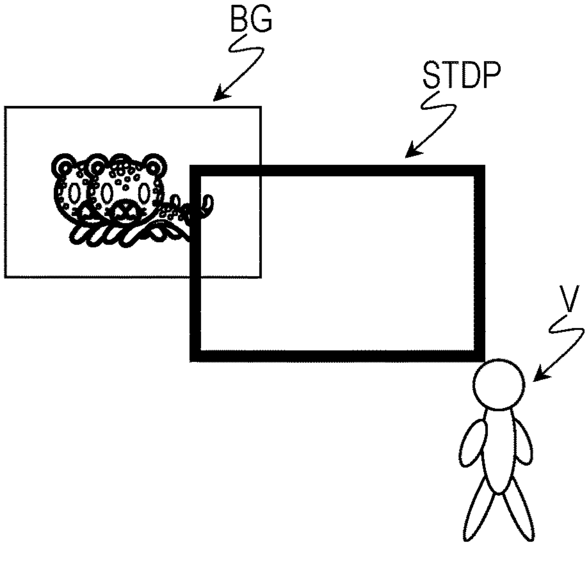
FIG. 29 is a schematic diagram illustrating a form in which double blurring occurs.

In a case where the liquid crystal display apparatus 1000 in the comparative example is simply used for the see-through display, when see-through display is performed, that is, display is performed to see the background through, the display is performed in the white display state being a state where light transmittance of a pixel is high. However, since the state for performing white display is a state where the liquid crystal molecules 1031 are aligned by applying a voltage to the liquid crystal layer 1030, the refractive index in a pixel is distributed. Therefore, light L from the back surface side is scattered due to the refractive index distribution (that is, traveling direction of light L varies; see FIG. 28(*b*)), and thus the background is blurred. As a result, as illustrated in FIG. 29, the background is viewed twice for an observer V who observes the background BG through a see-through display STDP.

As described above, if the see-through display is performed in the white display state being a state where a voltage is applied to the liquid crystal layer, double blurring occurs. On the contrary, in the liquid crystal display apparatus 700, background display (see-through display) is performed in a pixel of a state (transparent display state) in which a voltage is not applied to the liquid crystal layer 30. Thus, the background is clearly viewed for the observer who observes the background through the liquid crystal display apparatus 700. Therefore, the occurrence of double blurring is prevented and quality of the see-through display is improved.

Embodiment 8

Figure 30:
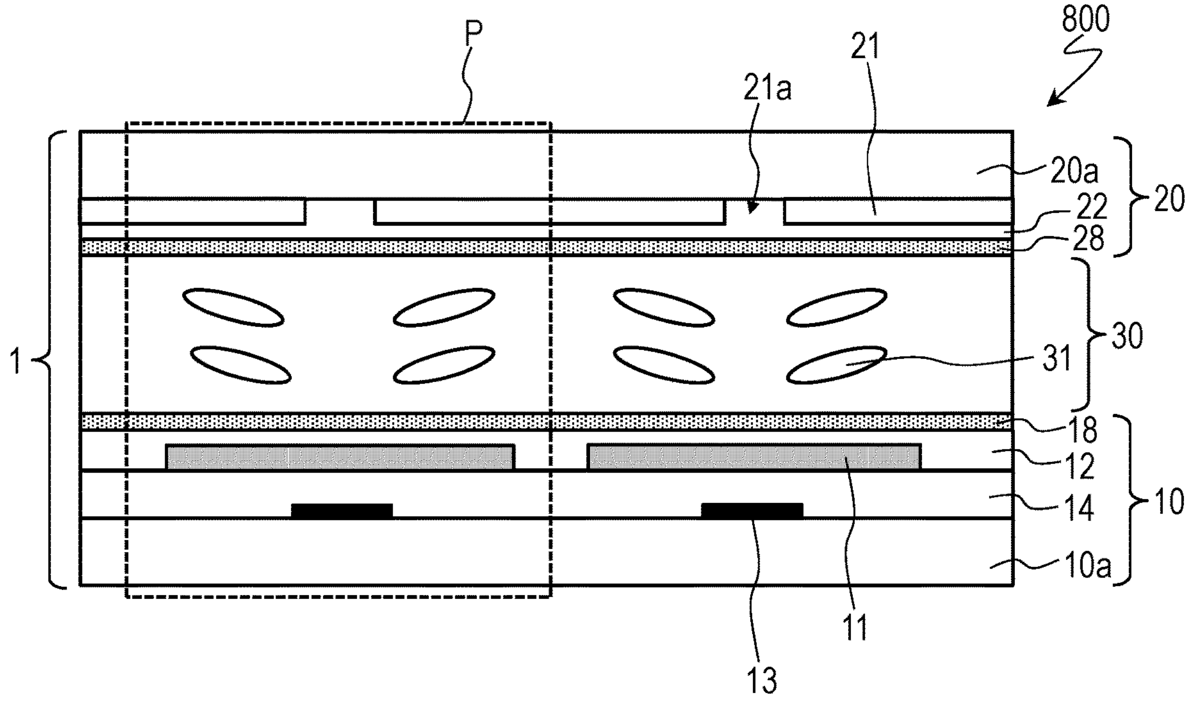
FIG. 30 is a sectional view schematically illustrating a liquid crystal display apparatus 800 according to still another embodiment of the present invention and illustrates regions corresponding to two pixels P.
Figure 31:
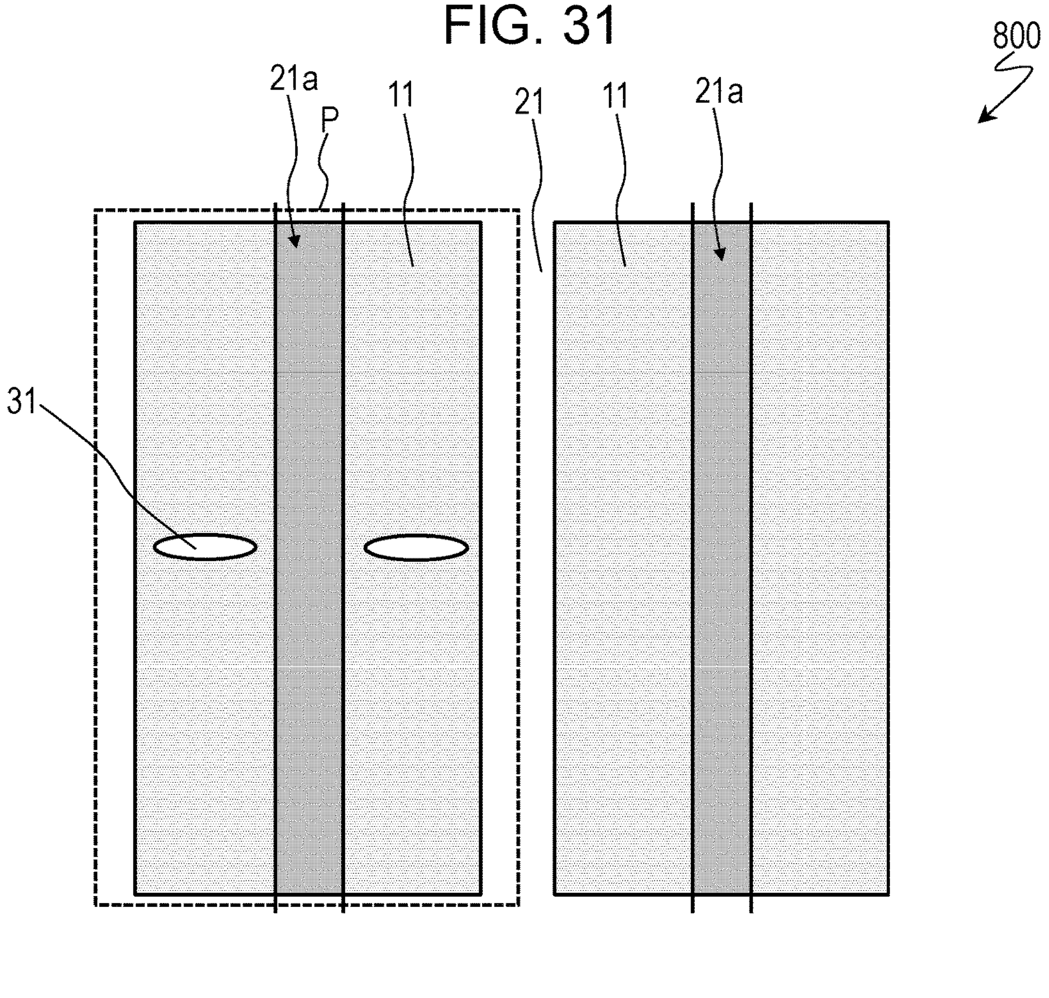
FIG. 31 is a plan view schematically illustrating the liquid crystal display apparatus 800 and illustrates the regions corresponding to the two pixels P.

FIGS. 30 and 31 illustrate a liquid crystal display apparatus 800 in an embodiment. FIGS. 30 and 31 are a sectional view and a plan view schematically illustrating the liquid crystal display apparatus 800, respectively. FIGS. 30 and 31 illustrate regions corresponding two pixels P which are adjacent to each other in the row direction.

The liquid crystal display apparatus 800 illustrated in FIGS. 30 and 31 is different from the liquid crystal display apparatus 100 in Embodiment 1 in that liquid crystal molecules 31 in a state where a voltage is not applied are homogeneously aligned (that is, in an alignment state where the twist angle is about 0°).

As illustrated in FIG. 31, the pretilt orientation determined by the first horizontal alignment film 12 is substantially parallel to the pretilt orientation determined by the second horizontal alignment film 22. The pretilt orientations determined by the first horizontal alignment film and the second horizontal alignment film are substantially orthogonal to the direction in which the slit 21*a* of the second electrode 21 extends.

Since the twist angle is about 0°, it is possible to realize transmittance which is equal to that in a case where the twist angle is about 90°, with the smaller cell thickness (thickness of the liquid crystal layer 30). If the cell thickness is reduced, the response characteristics are improved. Thus, it is possible to further improve the response characteristics by employing the configuration in which the twist angle is about 0°. The configuration in which the twist angle is about 90° is useful more than the configuration in which the twist angle is about 0°, in that there is hardly need to consider problems (coloring, viewing angle compensation, and the like) of optical compensation or wavelength dispersion in black display.

(Preferable Disposition of Light Shielding Layer)

Here, an example of disposing the light shielding layer will be described.

Figure 32:
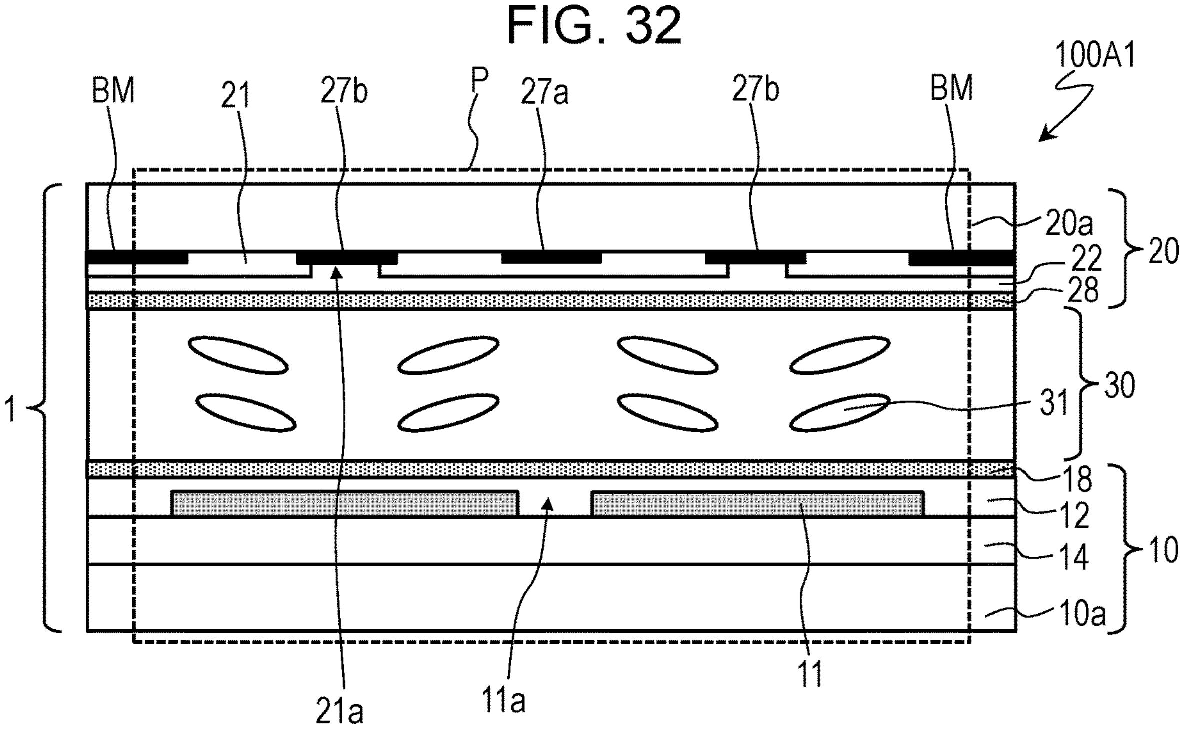
FIG. 32 is a sectional view schematically illustrating a liquid crystal display apparatus 100A1 according to still another embodiment of the present invention and illustrates a region corresponding to one pixel P.

A liquid crystal display apparatus 100A1 illustrated in FIG. 32 is a modified example of the liquid crystal display apparatus 100A illustrated in FIG. 6. In the liquid crystal display apparatus 100A1, the front substrate 20 includes a first light shielding layer 27*a* and a second light shielding layer 27*b* overlapping the anchoring structure. The first light shielding layer 27*a* overlaps the slit 11*a* of the first electrode 11, and the second light shielding layer 27*b* overlaps the slit 21*a* of the second electrode 21. FIG. 32 also illustrates a black matrix BM provided between the adjacent pixels P. The first light shielding layer 27*a* and the second light shielding layer 27*b* can be formed in the same step with the same material as that of the black matrix BM (for example, black photosensitive resin).

In the example illustrated in FIG. 32, the second light shielding layer 27*b* overlapping the slit 21*a* of the second electrode 21 is provided in the substrate (front substrate 20) the same as that for the second electrode 21. On the contrary, the first light shielding layer 27*a* overlapping the slit 11*a* of the first electrode 11 is provided in the substrate different from that for the first electrode 11. Therefore, if shift (bonding shift) occurs when the back substrate 10 and the front substrate 20 are bonded to each other, there is a probability that it is not possible to sufficiently shield the region over the slit 11*a* of the first electrode 11 from light by the first light shielding layer 27*a*.

Figure 33:
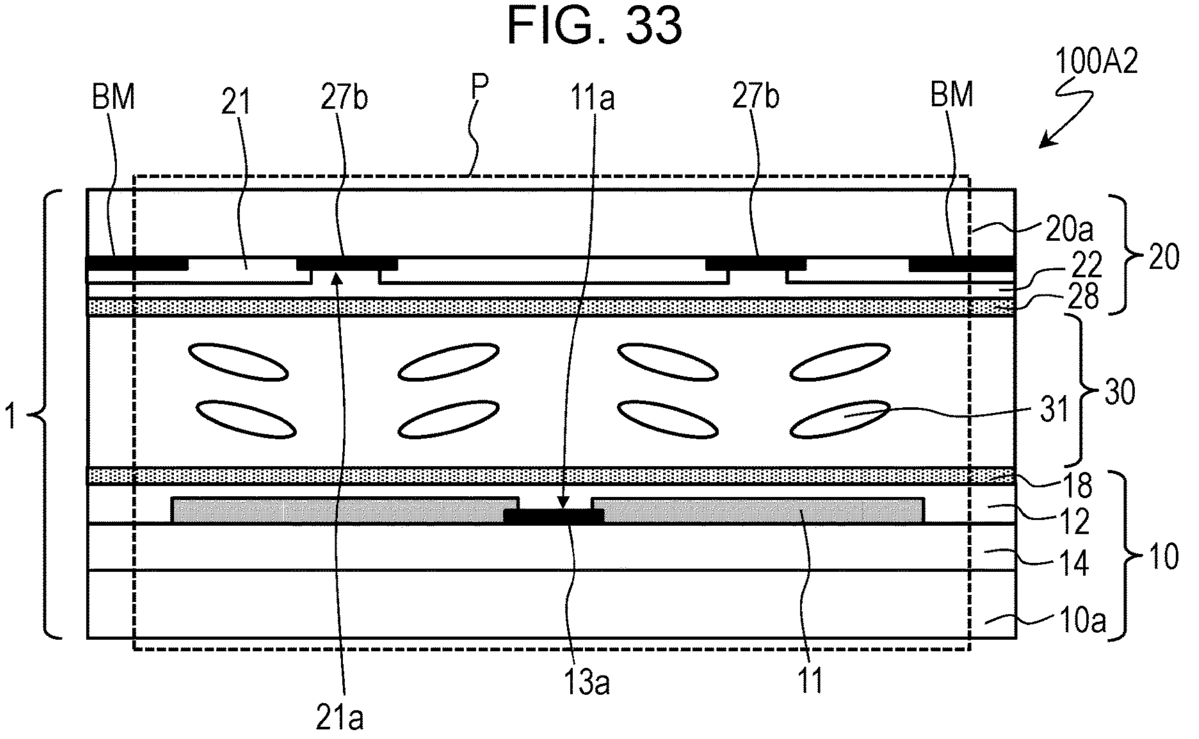
FIG. 33 is a sectional view schematically illustrating a liquid crystal display apparatus 100A2 according to still another embodiment of the present invention and illustrates a region corresponding to one pixel P.

A liquid crystal display apparatus 100A2 illustrated in FIG. 33 is another modified example of the liquid crystal display apparatus 100A illustrated in FIG. 6. In the liquid crystal display apparatus 100A2, the back substrate 10 includes the first light shielding layer 13*a* overlapping the slit 11*a* of the first electrode 11, and the front substrate 20 includes the second light shielding layer 27*b* overlapping the slit 21*a* of the second electrode 21. The first light shielding layer 13*a* can be formed in the same step with the same material (for example, metal material) as that of the bus line (for example, gate wire or source line).

In the example illustrated in FIG. 33, the second light shielding layer 27*b* overlapping the slit 21*a* of the second electrode 21 is provided in the substrate (front substrate 20) the same as that for the second electrode 21, and the first light shielding layer 13*a* overlapping the slit 11*a* of the first electrode 11 is provided in the substrate (back substrate 10) the same as that for the first electrode 11. Therefore, even though bonding shift occurs, it is possible to reliably shield the region over the slit 11*a* of the first electrode 11 from light by the first light shielding layer 13*a*.

As in the liquid crystal display apparatuses 200, 200A, and 200B in Embodiment 2, in a case where the rib 19 and/or 29 is provided as the anchoring structure, the rib 19 and/or 29 may have the light shielding property instead of providing a light shielding layer for overlapping the rib 19 and/or 29. If the rib 19 and/or 29 is formed of a material having the light shielding property, the rib 19 and/or 29 itself can function as the light shielding layer. Thus, it is possible to obtain an effect similar to that in the liquid crystal display apparatus 100A2 illustrated in FIG. 33.

Embodiment 9

Figure 34:
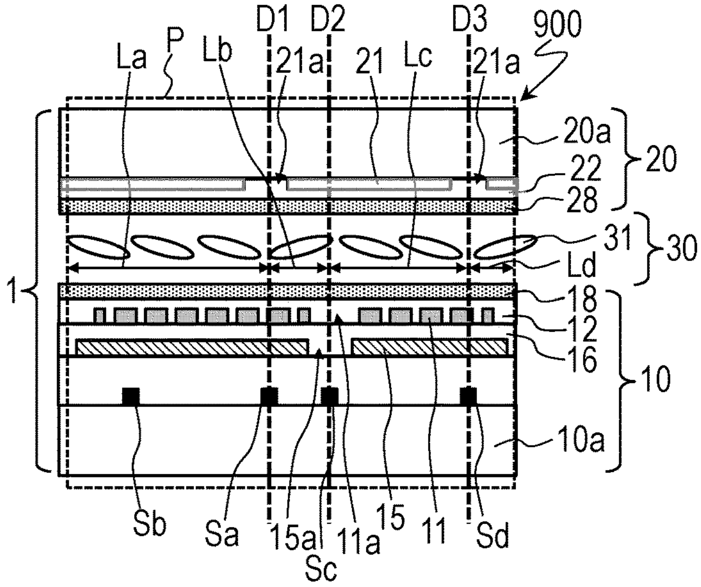
FIG. 34 is a sectional view schematically illustrating a liquid crystal display apparatus 900 according to still another embodiment of the present invention and illustrates a region corresponding to one pixel P.
Figure 35:
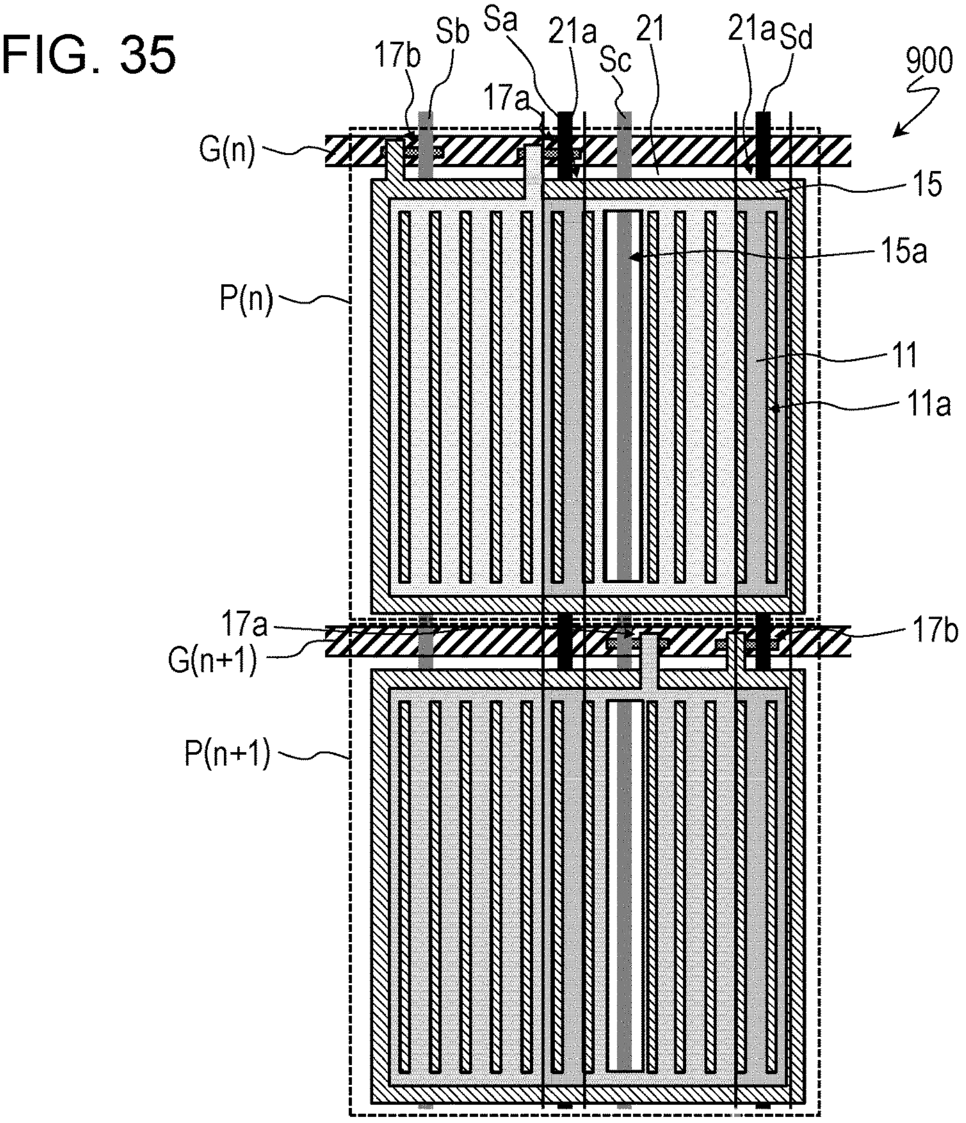
FIG. 35 is a plan view schematically illustrating a liquid crystal display apparatus 900 and illustrates regions corresponding to two pixels P.

FIGS. 34 and 35 illustrate a liquid crystal display apparatus 900 in an embodiment. FIGS. 34 and 35 are a sectional view and a plan view schematically illustrating the liquid crystal display apparatus 900, respectively. FIG. 34 illustrates a region corresponding to one pixel P. FIG. 35 illustrates two pixels which are adjacent to each other in the column direction, specifically, regions corresponding to a pixel P(n) in the n-th row and a pixel P(n+1) in the (n+1)th row in a pixel column.

Similar to the liquid crystal display apparatus 700 in Embodiment 7, the liquid crystal display apparatus 900 illustrated in FIGS. 34 and 35 includes an electrode structure of the on-and-on mode. The liquid crystal display apparatus 900 includes a first TFT 17*a* and a second TFT 17*b* for each pixel P. The first TFT is electrically connected to the first electrode 11, and the second TFT is electrically connected to the third electrode 15.

The first TFT 17*a* and the second TFT 17*b* in each pixel P are connected to a common gate wire. Specifically, the first TFT 17*a* and the second TFT 17*b* in a pixel P(n) in the n-th row are connected to a gate wire G(n). The first TFT 17*a* and the second TFT 17*b* in a pixel (n+1) in the (n+1)th row are connected to a gate wire G(n+1). That is, one gate wire is provided for each pixel row.

The first TFT 17*a* and the second TFT 17*b* in each pixel P are connected to source wires different from each other. Specifically, in a pixel P(n) in the n-th row, the first TFT 17*a* is connected to a source wire Sa, and the second TFT 17*b* is connected to a source wire Sb. Source wires connected to the first TFT 17*a* and the second TFT 17*b* in a pixel P are different from source wires connected to the first TFT 17*a* and the second TFT 17*b* in another pixel P which is adjacent to the pixel P in the column direction. Specifically, in a pixel P(n+1) in the (n+1)th row, the first TFT 17*a* is connected to a source wire Sc, and the second TFT 17*b* is connected to a source wire Sd. That is, four source wires are provided for each pixel column.

In the liquid crystal display apparatus 900 having a wire structure as described above, writing can be performed by simultaneously scanning two pixel rows (two-line simultaneous driving). It is possible to secure a writing time (charging time) in each pixel P longer than that in a case where writing is performed for each one pixel row, by two-line simultaneous driving.

In the structure illustrated in FIGS. 34 and 35, the source wire Sa and the source wire Sd overlap two anchoring structures (slits 21*a* of the second electrode 21) on the front substrate 20 side, respectively. The source wire Sc overlaps the anchoring structure on the back substrate 10 side (region in which the slit 11*a* of the first electrode 11 and the slit 15*a* of the third electrode 15 overlap each other). Therefore, the boundary (alignment boundaries D1, D2, and D3 in FIG. 34) between two domains positioned on both sides of each of the anchoring structures are shield from light by the source wires Sa, Sc, and Sd. That is, the source wires Sa, Sc, and Sd function as a light shielding layer overlapping the alignment boundaries D1, D2, and D3.

In the liquid crystal display apparatus 900 in the embodiment, anchoring structures are arranged such that the lengths of two domains positioned on both sides of each anchoring structure (length along a direction orthogonal to the direction in which the anchoring structure extends) are different from each other. Specifically, the lengths La and Lb of two domains on both sides of the alignment boundary D1 are different from each other. The lengths Lb and Lc of two domains on both sides of the alignment boundary D2 are different from each other, and the lengths Lc and Ld of two domains on both sides of the alignment boundary D3 are different from each other.

Therefore, the light shielding layers (source wires Sa, Sc, and Sd) that shield the alignment boundaries D1, D2, and D3 from light are arranged at an un-uniform pitch in each pixel P. Therefore, an occurrence of diffraction of light occurring by the light shielding layer is suppressed.

INDUSTRIAL APPLICABILITY

According to the embodiment of the present invention, there is provided a liquid crystal display apparatus in which it is possible to realize a horizontal alignment state in which a pretilt angle is greater than 0° even though a photoalignment film is not provided as a horizontal alignment film.

REFERENCE SIGNS LIST

1 LIQUID CRYSTAL DISPLAY PANEL
2 LIGHTING ELEMENT (BACKLIGHT)
2*a* LIGHT SOURCE UNIT
2*b* LIGHT GUIDE PLATE
10 FIRST SUBSTRATE (BACK SUBSTRATE)
10*a* TRANSPARENT SUBSTRATE
11 FIRST ELECTRODE
11*a* SLIT
11*b* FINE SLIT
12 FIRST HORIZONTAL ALIGNMENT FILM
13, 13*a* LIGHT SHIELDING LAYER
14 INSULATING LAYER
15 THIRD ELECTRODE
15*a* SLIT
16 INSULATING LAYER
17*a* FIRST TFT
17*b* SECOND TFT
18 FIRST ALIGNMENT SUSTAINING LAYER
19 RIB
20 SECOND SUBSTRATE (FRONT SUBSTRATE)
20*a* TRANSPARENT SUBSTRATE
21 SECOND ELECTRODE
21*a* SLIT
21*b* FINE SLIT
22 SECOND HORIZONTAL ALIGNMENT FILM
27*a*, 27*b* LIGHT SHIELDING LAYER
28 SECOND ALIGNMENT SUSTAINING LAYER
29 RIB
30 LIQUID CRYSTAL LAYER
31 LIQUID CRYSTAL MOLECULE
100, 100A, 100A1, 100A2 LIQUID CRYSTAL DISPLAY APPARATUS
200, 200A, 200B, 300, 300A LIQUID CRYSTAL DISPLAY APPARATUS
400, 400A, 500, 500A, 600, 700, 800 LIQUID CRYSTAL DISPLAY APPARATUS
P PIXEL
BM BLACK MATRIX
G(n), G(n+1) GATE BUS LINE
Sa, Sb, Sc, Sd SOURCE BUS LINE

The invention claimed is:

1. A liquid crystal display apparatus comprising:

a liquid crystal display panel which includes a first substrate and a second substrate facing each other and a liquid crystal layer provided between the first substrate and the second substrate; and a plurality of pixels arranged in a matrix, wherein the first substrate includes a first electrode which is provided in each of the plurality of pixels, and a first horizontal alignment film which is provided between the first electrode and the liquid crystal layer and determines a pretilt orientation of a liquid crystal molecule in the liquid crystal layer, the second substrate includes a second electrode provided to face the first electrode, and a second horizontal alignment film that is provided between the second electrode and the liquid crystal layer and determines the pretilt orientation of the liquid crystal molecule, each of the first horizontal alignment film and the second horizontal alignment film is a photoalignment film, at least one of the first substrate and the second substrate includes an anchoring structure of applying an anchoring force to the liquid crystal molecules at least when a voltage is applied to the liquid crystal layer, in each of the plurality of pixels, and the liquid crystal display panel further includes an alignment sustaining layer which is formed on a surface of each of the first horizontal alignment film and the second horizontal alignment film on the liquid crystal layer side, is configured with a photopolymer, and imparts a pretilt angle greater than 0° to the liquid crystal molecules in the liquid crystal layer, wherein the anchoring structure extends in a first direction, and the first electrode and/or the second electrode includes a plurality of third slits which extend in a second direction which is substantially orthogonal to the first direction and has a width smaller than a width of the anchoring structure.

2. The liquid crystal display apparatus according to claim 1, wherein the liquid crystal display panel includes a light shielding layer overlapping the anchoring structure.

3. A liquid crystal display apparatus comprising:

a liquid crystal display panel which includes a first substrate and a second substrate facing each other and a liquid crystal layer provided between the first substrate and the second substrate; and a plurality of pixels arranged in a matrix, wherein the first substrate includes a first electrode which is provided in each of the plurality of pixels, and a first horizontal alignment film which is provided between the first electrode and the liquid crystal layer and determines a pretilt orientation of a liquid crystal molecule in the liquid crystal layer, the second substrate includes a second electrode provided to face the first electrode, and a second horizontal alignment film that is provided between the second electrode and the liquid crystal layer and determines the pretilt orientation of the liquid crystal molecule, each of the first horizontal alignment film and the second horizontal alignment film is a photoalignment film, at least one of the first substrate and the second substrate includes an anchoring structure of applying an anchoring force to the liquid crystal molecules at least when a voltage is applied to the liquid crystal layer, in each of the plurality of pixels, and the liquid crystal display panel further includes an alignment sustaining layer which is formed on a surface of each of the first horizontal alignment film and the second horizontal alignment film on the liquid crystal layer side, is configured with a photopolymer, and imparts a pretilt angle greater than 0° to the liquid crystal molecules in the liquid crystal layer, wherein the anchoring structure extends in a first direction, the first electrode includes a plurality of fourth slits which extend in a third direction intersecting the first direction and has a width smaller than a width of the anchoring structure, the second electrode includes a plurality of fifth slits which extend in a fourth direction intersecting the first direction and has a width smaller than a width of the anchoring structure, the third direction is substantially parallel to the pretilt orientation determined by the first horizontal alignment film, and the fourth direction is substantially parallel to the orientation determined by the second horizontal alignment film.

4. The liquid crystal display apparatus according to claim 3, wherein the liquid crystal display panel includes a light shielding layer overlapping anchoring structure.

5. A liquid crystal display apparatus comprising:

a liquid crystal display panel which includes a first substrate and a second substrate facing each other and a liquid crystal layer provided between the first substrate and the second substrate; and a plurality of pixels arranged in a matrix, wherein the first substrate includes a first electrode which is provided in each of the plurality of pixels, and a first horizontal alignment film which is provided between the first electrode and the liquid crystal layer and determines a pretilt orientation of a liquid crystal molecule in the liquid crystal layer, the second substrate includes a second electrode provided to face the first electrode, and a second horizontal alignment film that is provided between the second electrode and the liquid crystal layer and determines the pretilt orientation of the liquid crystal molecule, each of the first horizontal alignment film and the second horizontal alignment film is a photoalignment at least one of the first substrate and the second substrate includes an anchoring structure of applying an anchoring force to the liquid crystal molecules at least when a voltage is applied to the liquid crystal layer, in each of the plurality of pixels, and the liquid crystal display panel further includes an alignment sustaining layer which is formed on a surface of each of the first horizontal alignment film and the second horizontal alignment film on the liquid crystal layer side, is configured with a photopolymer, and imparts a pretilt angle greater than 0° to the liquid crystal molecules in the liquid crystal layer, wherein the anchoring structure extends in a first direction, in each of the plurality of pixels, the liquid crystal layer includes two regions which are positioned on both sides of the anchoring structure and have pretilt directions different from each other, the pretilt direction being represented by the pretilt orientation determined by the first horizontal alignment film and the pretilt angle determined by the alignment sustaining layer formed on the surface of the first horizontal alignment film on the liquid crystal layer side, and lengths of the two regions in a direction orthogonal to the first direction are different from each other.

6. The liquid crystal display apparatus according to claim 5, wherein the liquid crystal display panel includes a light shielding layer overlapping the anchoring structure.

7. The liquid crystal display apparatus according to claims 5, wherein the first substrate includes a third electrode that generates a transverse electric field along with the first electrode in the liquid crystal layer.

8. The liquid crystal display apparatus according to claim 7, wherein the first electrode is provided to be positioned on the third electrode with an insulating layer interposed between the first electrode and the third electrode.

9. The liquid crystal display apparatus according to claims 5, wherein each of the plurality of pixels is capable of being switched between a black display state, a white display state, and a transparent display state, the black display state in which black display is performed in a state where a vertical electric field is generated in the liquid crystal layer, the white display state in which white display is performed in a state where a transverse electric field is generated in the liquid crystal layer, and the transparent display state in which a back surface side of the liquid crystal display panel is seen through in a state where a voltage is not applied to the liquid crystal layer.

* * * * *